US008161820B2

(12) United States Patent
Yoneda et al.

(10) Patent No.: US 8,161,820 B2
(45) Date of Patent: Apr. 24, 2012

(54) PRESSURE SENSOR

(75) Inventors: Masayuki Yoneda, Tokyo (JP);
Tomohisa Tokuda, Tokyo (JP)

(73) Assignee: Yamatake Corporation, Tokyo (JP)

( * ) Notice: Subject to any disclaimer, the term of this patent is extended or adjusted under 35 U.S.C. 154(b) by 387 days.

(21) Appl. No.: 12/574,075

(22) Filed: Oct. 6, 2009

(65) Prior Publication Data

US 2010/0083765 A1 Apr. 8, 2010

(30) Foreign Application Priority Data

Oct. 7, 2008 (JP) .................................. 2008-260954

(51) Int. Cl.
*G01L 9/06* (2006.01)
(52) U.S. Cl. ................. 73/721; 73/715; 73/716; 73/720
(58) Field of Classification Search .......................... None
See application file for complete search history.

(56) References Cited

U.S. PATENT DOCUMENTS

| 4,203,128 | A | * | 5/1980 | Guckel et al. | 331/156 |
|---|---|---|---|---|---|
| 4,528,855 | A | * | 7/1985 | Singh | 73/721 |
| 4,530,244 | A | * | 7/1985 | Starr | 73/727 |
| 5,259,248 | A | * | 11/1993 | Ugai et al. | 73/721 |
| 5,291,788 | A | | 3/1994 | Oohata | |
| 5,412,992 | A | * | 5/1995 | Tobita et al. | 73/721 |
| 5,458,000 | A | * | 10/1995 | Burns et al. | 73/708 |
| 5,537,882 | A | * | 7/1996 | Ugai et al. | 73/727 |
| 5,677,493 | A | | 10/1997 | Yamamoto | |
| 2008/0041164 | A1 | * | 2/2008 | Cottles et al. | 73/726 |
| 2010/0083765 | A1 | | 4/2010 | Yoneda | |
| 2010/0083766 | A1 | | 4/2010 | Yoneda et al. | |

FOREIGN PATENT DOCUMENTS

| CN | 1055060 A | 10/1991 |
|---|---|---|
| JP | 05072069 A | 3/1993 |
| JP | 5-196525 A | 8/1993 |
| JP | 6-102128 A | 4/1994 |
| JP | 06-213746 A | 8/1994 |
| JP | 7-113707 A | 5/1995 |
| JP | 8-240494 A | 9/1996 |
| JP | 09-304206 A | 11/1997 |
| JP | 3359493 B | 11/1997 |
| JP | 2002-277337 A | 9/2002 |

OTHER PUBLICATIONS

Z. Xiuwen, et al., Development of Polysilicon Pressure Sensor with High Performance, Journal of Transcluction Technology, 1993.
U.S. Appl. No. 12/574,261: Non-Final Office Action mailed Feb. 18, 2011.

* cited by examiner

*Primary Examiner* — Lisa Caputo
*Assistant Examiner* — Jermaine Jenkins
(74) *Attorney, Agent, or Firm* — McDermott Will & Emery LLP

(57) ABSTRACT

A pressure sensor according to the present invention comprises: a differential pressure diaphragm; a static pressure diaphragm, which is provided to an outer perimeter part of the differential pressure diaphragm; a first static pressure gauge pair that is formed in the end part of the static pressure diaphragm and comprises two static pressure gauges, which are disposed such that they sandwich the differential pressure diaphragm; and a second static pressure gauge pair that is formed in the center part of the static pressure diaphragm and comprises two static pressure gauges which are disposed such that they sandwich the differential pressure diaphragm.

12 Claims, 17 Drawing Sheets

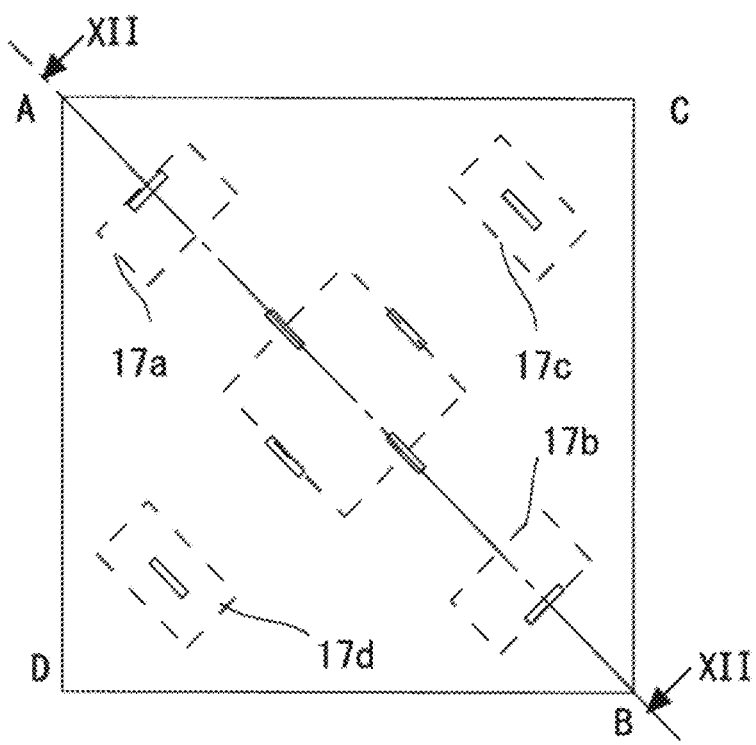

PRESSURE SENSOR

CROSS REFERENCE TO PRIOR APPLICATIONS

The present application claims priority under U.S.C. §119 to Japanese Patent Application No. 2008-260954, filed Oct. 7, 2008. The content of the application is incorporated herein by reference in its entirety.

1. Field of the Invention

The present invention relates to a pressure sensor and more particularly relates to a pressure sensor that has a diaphragm.

2. Background of the Invention

Because pressure sensors that take advantage of a semiconductor's piezoresistive effect are compact, lightweight, and highly sensitive, they are widely used in the fields of industrial measurement, medical care, and the like. In such pressure sensors, a diaphragm is formed on a semiconductor substrate. Furthermore, a strain gauge is formed on the diaphragm. When pressure is applied to the diaphragm, the strain gauge deforms. The piezoresistive effect allows any change in the resistance of the strain gauge to be detected, and thereby the pressure is measured.

In addition, to reduce crosstalk, a pressure sensor that provides static pressure detection gauges at optimal positions has been disclosed (refer to Japanese Unexamined Patent Application Publication No. 2002-277337 ("JP '337")). In the pressure sensor according to JP '337, static pressure detection gauges are provided on the outer sides of a bonded part between a sensor chip and a pedestal. Specifically, a square differential pressure diaphragm is formed in the center of the sensor chip. Furthermore, differential pressure detection gauges are provided to the perimeter edge parts or center part of the differential pressure diaphragm. The static pressure detection gauges are provided on the outer sides of the differential pressure diaphragm.

Furthermore, a pressure sensor that provides a static pressure detection diaphragm on a semiconductor substrate has been disclosed (refer to Japanese Unexamined Patent Application Publication No. H6-213746 ("JP '746")). In the pressure sensor according to JP '746, an annular static pressure diaphragm is formed on the outer perimeter of a circular differential pressure diaphragm. Furthermore, four static pressure gauges are formed on the static pressure diaphragm. The four static pressure gauges are disposed at equal intervals in the perimeter directions. Namely, each of two sets of two of the static pressure gauges is disposed such that they oppose one another and thereby sandwich the differential pressure diaphragm. Forming the static pressure diaphragm makes it possible to improve the sensitivity of the static pressure.

As mentioned above, a piezoresistive device, wherein resistance varies with strain, is used as a gauge. Namely, the resistance of the piezoresistive device varies with the warpage of the semiconductor substrate generated by some pressure. Using a bridge circuit to detect the amount of change in the resistance makes it possible to measure the pressure.

The ambient temperature in which measurement is performed adversely affects piezoresistive devices. Thermal stress, for example, can arise owing to differences in the coefficients of thermal expansion of the semiconductor substrate, a glass pedestal, and the like. This thermal stress generates strain in the gauge on the semiconductor substrate. Accordingly, differences in the ambient temperature during the measurement cause measurement error.

In addition, in a pressure sensor, it is necessary to reduce the size of the diaphragm to achieve compactness. Unfortunately, reducing the size of the diaphragm decreases measurement sensitivity. For example, if the aspect ratio of the static pressure detection diaphragm is made constant, then the peak value of the stress will likewise be constant. Nevertheless, even if the aspect ratio is made constant, reducing the size of the diaphragm decreases the peak width of the stress. Consequently, sufficient sensitivity cannot be achieved, which is a problem. In other words, increasing the size of the diaphragm in order to raise the measurement sensitivity makes it difficult, in turn, to decrease the size of the pressure sensor (i.e., to make it more compact).

Thus, it is difficult to implement a high performance pressure sensor that is also compact, which is a problem.

The present invention was conceived to solve the aforementioned problems; it is an object of the present invention to provide a compact, high performance pressure sensor.

SUMMARY OF THE INVENTION

A pressure sensor according to an aspect of the invention includes: a substrate; a differential pressure diaphragm, which is provided to a center part of the substrate; a differential pressure gauge, which is provided to the differential pressure diaphragm; a static pressure diaphragm, which is provided to an outer perimeter part of the differential pressure diaphragm; a first static pressure gauge pair that is formed in the end part of the static pressure diaphragm and comprises two static pressure gauges, which are disposed such that they sandwich the differential pressure diaphragm; and a second static pressure gauge pair that is formed in the center part of the static pressure diaphragm and comprises two static pressure gauges, which are disposed such that they sandwich the differential pressure diaphragm. Thereby, it is possible to prevent a decrease in measurement sensitivity even if the pressure sensor is made compact. In addition, it is possible to prevent measurement error owing to temperature changes. Thereby, it is possible to implement a compact, high performance pressure sensor.

A pressure sensor according to an aspect of the invention is the pressure sensor mentioned above, wherein a straight line that connects the static gauges of the first static pressure gauge pair and a straight line that connects the static gauges of the second static pressure gauge pair are disposed orthogonally. Thereby, it is possible to prevent a decrease in measurement sensitivity even if the pressure sensor is made compact. In addition, it is possible to prevent measurement error owing to temperature changes. Thereby, it is possible to implement a compact, high performance pressure sensor.

A pressure sensor according to another aspect of the invention is the pressure sensor mentioned above, wherein the straight line that connects the static gauges of the first static pressure gauge pair and the straight line that connects the static gauges of the second static pressure gauge pair are disposed such that they coincide. Thereby, it is possible to prevent a decrease in measurement sensitivity even if the pressure sensor is made compact. In addition, it is possible to prevent measurement error owing to temperature changes. Thereby, it is possible to implement a compact, high performance pressure sensor.

A pressure sensor according to a further aspect of the invention is the pressure sensor mentioned above, wherein the two static pressure gauges included in the first static pressure gauge pair are formed in either the end parts of the static pressure diaphragm on the substrate center side or the end parts of the static pressure diaphragm on the substrate end sides. Thereby, measurement sensitivity and the temperature characteristics can be improved.

A pressure sensor according to an aspect of the invention is the pressure sensor according to the above aspect of the invention, wherein four static pressure diaphragms are provided corresponding to the four static pressure gauges included in the first and second static pressure gauge pairs; and the latitudinal directions of the four static pressure diaphragms are disposed in the radial directions with respect to the center of the differential pressure diaphragm. Thereby, measurement sensitivity and the temperature characteristics can be improved.

A pressure sensor according to another aspect of the invention is the pressure sensor according to the above aspect of the invention, wherein two of the static pressure diaphragms are provided corresponding to the four static pressure gauges included in the first and second static pressure gauge pairs; and the latitudinal directions of the two static pressure detection diaphragms are disposed in the radial directions with respect to the center of the differential pressure diaphragm. Thereby, measurement sensitivity and the temperature characteristics can be improved.

A pressure sensor according to a further aspect of the invention is the pressure sensor mentioned above, wherein the four static pressure gauges included in the first and second static pressure gauge pairs are formed in directions perpendicular to the latitudinal directions of the static pressure diaphragm. Thereby, measurement sensitivity and the temperature characteristics can be improved.

A pressure sensor according to an aspect of the invention is the pressure sensor according to the above aspects of the invention, wherein the static pressure diaphragm is oblong. Thereby, measurement sensitivity and the temperature characteristics can be improved.

A pressure sensor according to another aspect of the invention is the pressure sensor mentioned above, wherein the static pressure diaphragm is formed in an annular shape such that it surrounds the differential pressure diaphragm; and the four static pressure gauges included in the first and second static pressure gauge pairs are formed in the circumferential directions of the annular static pressure diaphragm. Thereby, measurement sensitivity and the temperature characteristics can be improved.

A pressure sensor according to a further aspect of the invention is the pressure sensor mentioned above, wherein the differential pressure diaphragm is circular. Thereby, measurement sensitivity and the temperature characteristics can be improved.

A pressure sensor according to an aspect of the invention is the pressure sensor mentioned above, wherein the annular static pressure diaphragm and the circular differential pressure diaphragm are disposed concentrically. Thereby, measurement sensitivity and the temperature characteristics can be improved.

A pressure sensor according to another aspect of the invention is the pressure sensor mentioned above, wherein the substrate is circular. Thereby, measurement sensitivity and the temperature characteristics can be improved.

Effects of the Invention

According to the present invention, it is possible to provide a compact, high performance pressure sensor.

DETAILED DESCRIPTION OF THE INVENTION

Brief Description of the Drawings

The following text explains in detail specific embodiments wherein the present invention is adapted, referencing the drawings. FIG. 1 is a top view that shows the configuration of a sensor chip used in a pressure sensor according to the present embodiment. FIG. 2 is a cross sectional view taken along the II-II line of FIG. 1, and FIG. 3 is a cross sectional view taken along the III-III line of FIG. 1. The pressure sensor according to the present embodiment is a semiconductor pressure sensor that takes advantage of the piezoresistive effect of semiconductors.

The pressure sensor has a sensor chip 10, which is a semiconductor substrate. The sensor chip 10 has a square shape. As shown in FIG. 1, the vertices of the square sensor chip 10 are designated as A, B, C, D. As shown in FIG. 1, the upper left corner is designated as corner A, the lower right corner is designated as corner B, the upper right corner is designated as corner C, and the lower left corner is designated as corner D. The diagonal line that connects the corner A and the corner B is designated as diagonal line AB. The diagonal line that connects the corner C and the corner D is designated as diagonal line CD. Because the sensor chip 10 has a square shape, the diagonal line AB and the diagonal line CD are orthogonal.

As shown in FIG. 2, the sensor chip 10 has a three-layer structure that includes a first semiconductor layer 1, which constitutes a base, an insulation layer 2, and a second semiconductor layer 3. For example, a silicon-on-insulator (SOI) substrate that comprises the first semiconductor layer 1, the insulation layer 2, which has a thickness of approximately 0.5 µm, and the second semiconductor layer 3 can be used as the sensor chip 10. The first semiconductor layer 1 and the second semiconductor layer 3 each have, for example, an n-type monocrystalline silicon layer. The insulation layer 2 comprises, for example, an $SiO_2$ layer. The insulation layer 2 is formed on the first semiconductor layer 1. In addition, the second semiconductor layer 3 is formed on the insulation layer 2. Accordingly, the insulation layer 2 is disposed between the first semiconductor layer 1 and the second semiconductor layer 3. When the first semiconductor layer 1 is etched, the insulation layer 2 functions as an etching stop. The second semiconductor layer 3 comprises a differential pressure diaphragm 4. As shown in FIG. 1, the differential pressure diaphragm 4 is provided to and disposed at a center portion of the sensor chip 10.

The differential pressure diaphragm 4 for detecting differential pressure is provided at the center part of the sensor chip 10. As shown in FIGS. 1 and 2, the differential pressure diaphragm 4 is formed by eliminating the first semiconductor layer 1. Namely, the formation of the differential pressure diaphragm 4 makes the sensor chip 10 thinner. Here, as shown in FIG. 1, the differential pressure diaphragm 4 is formed as a square. In addition, the center of the differential pressure diaphragm 4 and the center of the sensor chip 10 coincide. Namely, the center point of the sensor chip 10 is at the intersection point of the diagonal line AB and the diagonal line CD. Furthermore, the differential pressure diaphragm 4 is disposed tilted by 45° with respect to the square sensor chip 10. Accordingly, the diagonal line AB perpendicularly passes through the centers of two opposing sides of the differential pressure diaphragm 4. In addition, the diagonal line CD perpendicularly passes through the centers of the other two opposing sides of the differential pressure diaphragm 4.

Figure 1:
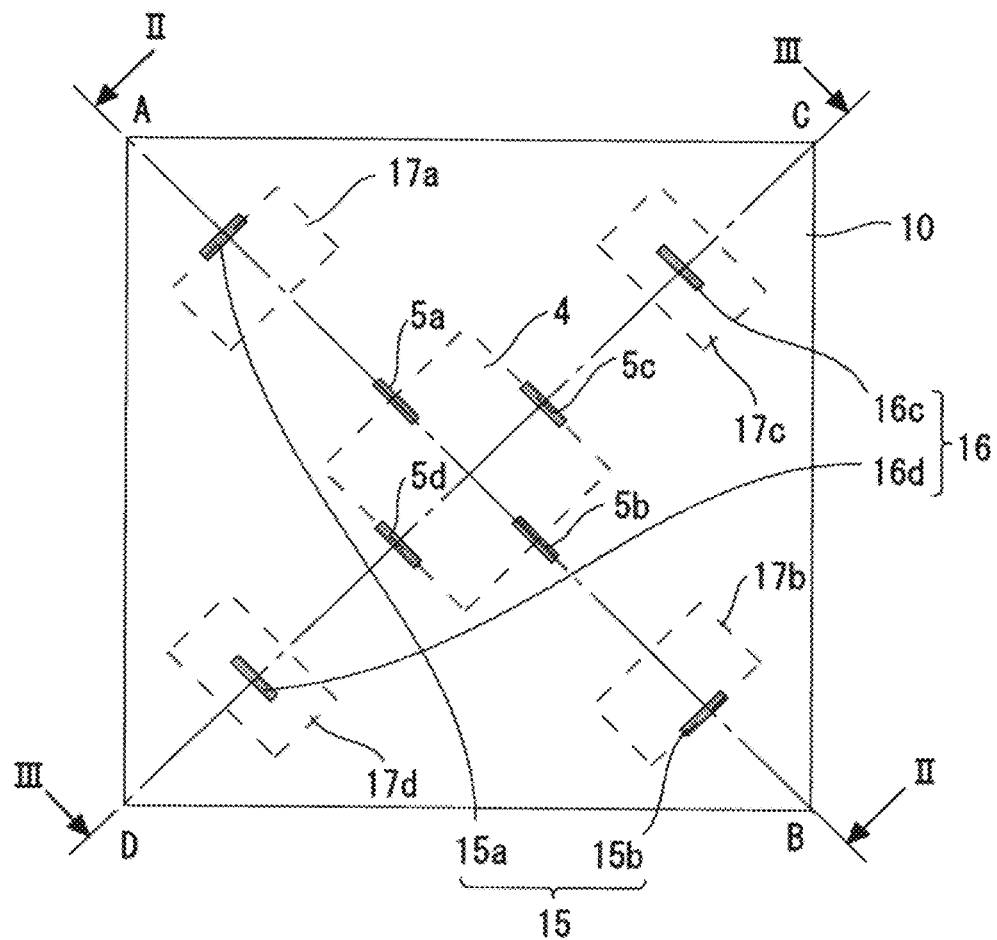
FIG. 1 is a top view that shows the configuration of a pressure sensor according to an embodiment of the present invention.

Differential pressure gauges 5a-5d are provided to the front surface of the differential pressure diaphragm 4. These four differential pressure gauges 5a-5d are collectively called differential pressure gauges 5. The differential pressure gauges 5 are provided to the end parts of the differential pressure diaphragm 4. Namely, the differential pressure gauges 5 are formed on the perimeter edge parts of the differential pressure diaphragm 4. Here, one of the differential pressure gauges 5 is provided to each side of the square differential pressure diaphragm 4. These differential pressure gauges 5 are provided to the center of each side of the differential pressure diaphragm 4. Accordingly, the differential pressure gauge 5a is disposed between the center of the differential pressure diaphragm 4 and the corner A. The differential pressure gauge 5b is disposed between the center of the differential pressure diaphragm 4 and the corner B, the differential pressure gauge 5c is disposed between the center of the differential pressure diaphragm 4 and the corner C, and the differential pressure gauge 5d is disposed between the center of the differential pressure diaphragm 4 and the corner D. The differential pressure gauge 5a and the differential pressure gauge 5b are opposed to one another and sandwich the center of the sensor chip 10. The differential pressure gauge 5c and the differential pressure gauge 5d are opposed to one another and sandwich the center of the sensor chip 10.

Figure 2:
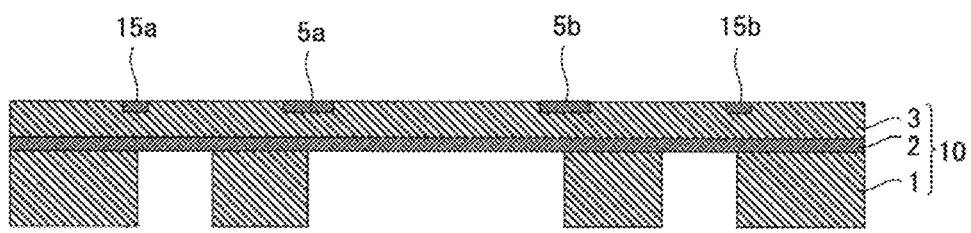
FIG. 2 is a cross sectional view taken along the II-II line in FIG. 1.
Figure 3:
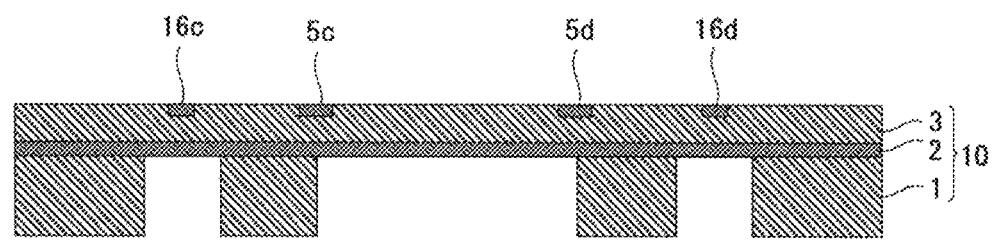
FIG. 3 is a cross sectional view taken along the III-III line in FIG. 1.

The differential pressure gauges 5 are strain gauges, each of which produces the piezoresistive effect. Accordingly, when the sensor chip 10 warps, the resistance of each of the differential pressure gauges 5a-5d changes. Furthermore, wiring (not shown) that connects each of the differential pressure gauges 5a-5d is formed on an upper surface of the sensor chip 10. For example, wiring is formed at both ends of each of the differential pressure gauges 5a-5d. The wiring connects the four differential pressure gauges 5 to a bridge circuit. The pressure differential of spaces separated by the differential pressure diaphragm 4 deforms the differential pressure diaphragm 4. The resistance of each of the differential pressure gauges 5 varies with the amount of deformation of the differential pressure diaphragm 4. Detecting these changes in resistance makes it possible to measure the pressure. As shown in FIG. 2 and FIG. 3, the differential pressure gauges 5 are formed on the front surface of the sensor chip 10.

The four differential pressure gauges 5a-5d are disposed such that they are parallel to one another. Namely, the longitudinal directions of the four differential pressure gauges 5a-5d are provided along the diagonal line AB. Furthermore, wiring (not shown) is connected to both ends of each of the differential pressure gauges 5a-5d in the longitudinal directions. Each of the differential pressure gauges 5 is formed in a crystallographic plane orientation (100) of the sensor chip 10 such that it is parallel to the crystallographic axial directions <110>, wherein the piezoresistive coefficient is maximal.

Furthermore, four static pressure diaphragms 17a-17d are provided to the sensor chip 10. These four static pressure diaphragms 17a-17d are collectively called static pressure diaphragms 17. As shown in FIG. 1, the static pressure diaphragms 17 are formed by eliminating the first semiconductor layer 1. Namely, the formation of the static pressure diaphragms 17 makes the sensor chip 10 thinner. The static pressure diaphragms 17 are disposed in outer perimeter parts of the differential pressure diaphragm 4. Namely, the static pressure diaphragms 17 are disposed on the outer sides of the differential pressure diaphragm 4. The four static pressure diaphragms 17a-17d are disposed such that they are point symmetric with respect to the center of the sensor chip 10.

Accordingly, the static pressure diaphragm 17a and the static pressure diaphragm 17b are disposed such that they oppose one another and sandwich the differential pressure diaphragm 4. Furthermore, the static pressure diaphragm 17a and the static pressure diaphragm 17b are disposed on the diagonal line AB. Likewise, the static pressure diaphragm 17c and the static pressure diaphragm 17d are disposed such that they oppose one another and sandwich the differential pressure diaphragm 4. Furthermore, the static pressure diaphragm 17c and the static pressure diaphragm 17d are disposed on the diagonal line CD. Furthermore, the distance from the center of the sensor chip 10 to each of the static pressure diaphragms 17a-17d is the same.

The static pressure diaphragm 17a is disposed between the differential pressure gauge 5a and the corner A. Likewise, the static pressure diaphragm 17b is disposed between the differential pressure gauge 5b and the corner B, the static pressure diaphragm 17c is disposed between the differential pressure gauge 5c and the corner C, and the static pressure diaphragm 17d is disposed between the differential pressure gauge 5d and the corner D. The static pressure diaphragms 17a-17d all have the same size and shape.

Each of the static pressure diaphragms 17 is formed as an oblong. Accordingly, the long sides and the short sides of each of the static pressure diaphragms 17 are orthogonal. Namely, each of the static pressure diaphragms 17 has longitudinal directions and latitudinal directions. Here, the directions that extend from the center of the sensor chip 10 toward the outer side are the radial directions (i.e., the r directions). Namely, the directions that extend from the center point of the sensor chip 10 toward the ends of the sensor chip 10 are the radial directions. Because the centers of the sensor chip 10 and the differential pressure diaphragm 4 coincide, these radial directions are the radial directions with respect to the center of the differential pressure diaphragm 4. Furthermore, the directions that are orthogonal to the radial directions are the perimeter directions (i.e., the θ directions). The perimeter directions correspond to the tangential directions of a circle whose center is the center of the sensor chip 10. The short sides of each of the static pressure diaphragms 17 are parallel to the radial directions.

The short sides of the static pressure diaphragms 17a, 17b are parallel to the diagonal line AB, and the short sides of the static pressure diaphragms 17c, 17d are parallel to the diagonal line CD. Thus, the latitudinal directions of any two opposing static pressure diaphragms (e.g., the static pressure diaphragm 17a and the static pressure diaphragm 17b) are parallel. Furthermore, the latitudinal directions of static pressure diaphragms 17 that are adjacent in the perimeter directions (e.g., the static pressure diaphragm 17a and the static pressure diaphragm 17c) are perpendicular. In addition, the longitudinal directions of each of the static pressure diaphragms 17 on the diagonal line AB and the longitudinal directions of each of the static pressure diaphragms 17 on the diagonal line CD are parallel, and the perimeter directions of each of the static pressure diaphragms 17 on the diagonal line AB and the perimeter directions of each of the static pressure diaphragms 17 on the diagonal line CD are parallel. The four static pressure diaphragms 17 are disposed at equal intervals in the perimeter directions.

A static pressure gauge 15a is formed on the static pressure diaphragm 17a. Likewise, a static pressure gauge 15b is formed on the static pressure diaphragm 17b, a static pressure gauge 16c is formed on the static pressure diaphragm 17c, and a static pressure gauge 16d is formed on the static pressure diaphragm 17d. Here, the two static pressure gauges 15a, 15b are designated as a static pressure gauge pair 15. Likewise, the two static pressure gauges 16c, 16d are designated as a static pressure gauge pair 16.

Like the differential pressure gauges 5, the static pressure gauges 15a, 15b, 16c, 16d are strain gauges. Accordingly, when the sensor chip 10 warps, the resistance of each of the static pressure gauges 15a, 15b, 16c, 16d changes owing to the piezoresistive effect. The static pressure gauges 15a, 15b, 16c, 16d are connected to a bridge circuit, like the differential pressure gauges 5. Thereby, the static pressure can be measured. Furthermore, as shown in FIG. 2 and FIG. 3, the static pressure gauges 15a, 15b, 16c, 16d are formed in the front surface of the sensor chip 10. Wiring (not shown) is connected to both ends of each of the static pressure gauges 15a, 15b, 16c, 16d in the longitudinal directions. Furthermore, as in the differential pressure gauges 5, the static pressure gauges 15a, 15b, 16c, 16d are wired to the bridge circuit.

The two static pressure gauges 15a, 15b included in the static pressure gauge pair 15 are disposed such that they oppose one another and sandwich the differential pressure diaphragm 4. The static pressure gauges 15a, 15b are formed on the diagonal line AB. The static pressure gauges 15a, 15b are formed symmetrically with respect to the center of the sensor chip 10. The distance from the center of the sensor chip 10 to the static pressure gauge 15a is equal to the distance from the center of the sensor chip 10 to the static pressure gauge 15b.

The two static pressure gauges 16c, 16d included in the static pressure gauge pair 16 are disposed such that they oppose one another and sandwich the differential pressure diaphragm 4. The static pressure gauges 16c, 16d are formed on the diagonal line CD. The static pressure gauges 16c, 16d are formed symmetrically with respect to the center of the sensor chip 10. Namely, the distance from the center of the sensor chip 10 to the static pressure gauge 16c is equal to the distance from the center of the sensor chip 10 to the static pressure gauge 16d.

The static pressure gauges 15a, 15b are respectively disposed at the end parts of the static pressure diaphragms 17a, 17b. Namely, the static pressure gauges 15a, 15b respectively overlap the perimeter edges of the static pressure diaphragms 17a, 17b. Moreover, the static pressure gauges 16c, 16d are respectively disposed at the center parts of the static pressure diaphragms 17c, 17d. Namely, the static pressure gauges 16c, 16d do not respectively overlap the perimeter edges of the static pressure diaphragms 17c, 17d. The distance from the center of the sensor chip 10 to the static pressure gauge 15a (or the static pressure gauge 15b) is different from the distance from the center of the sensor chip 10 to the static pressure gauge 16c (or the static pressure gauge 16d).

Here, the static pressure gauges 15a, 15b are formed on the perimeter edges of the static pressure diaphragms 17a, 17b on the sensor chip end sides. Namely, the static pressure gauge 15a is formed on the long side of the static pressure diaphragm 17a on the corner A side. Likewise, the static pressure gauge 15b is disposed on the long side of the static pressure diaphragm 17b on the corner B side. The distance from the center of the sensor chip 10 to the static pressure gauge 15a or the static pressure gauge 15b is longer than the distance from the center of the sensor chip 10 to the static pressure gauge 16c or the static pressure gauge 16d. Furthermore, the static pressure gauge 15a and the static pressure gauge 15b may be disposed on the long sides that are on the center side of the sensor chip 10. Namely, in the present embodiment, the two static pressure gauges 15a, 15b included in the static pressure gauge pair 15 are formed on the long sides of the static pressure diaphragms 17a, 17b, but their configuration is not limited to the long sides; for example, they may be formed in the end parts of the static pressure diaphragms 17a, 17b on the chip center side, or at locations in the vicinity of these end parts on the chip end side at which the maximum stress is generated.

Thus, the first static pressure gauge pair 15 and the second static pressure gauge pair 16 change the positions at which the static pressure gauges are disposed on the static pressure diaphragms 17. Namely, the opposing two static pressure gauges 15a, 15b are disposed at end parts of the static pressure diaphragms 17a, 17b, and the opposing two static pressure gauges 16c, 16d are disposed at center parts of the static pressure diaphragms 17c, 17d. In so doing, it is possible to prevent a decrease in measurement sensitivity even if the sensor chip 10 is made compact. Furthermore, it is possible to prevent measurement error owing to temperature changes in the measurement environment. Namely, the temperature characteristics of the pressure sensor can be improved. Adopting the abovementioned configuration makes it possible to implement a compact, high performance pressure sensor.

Figure 4:
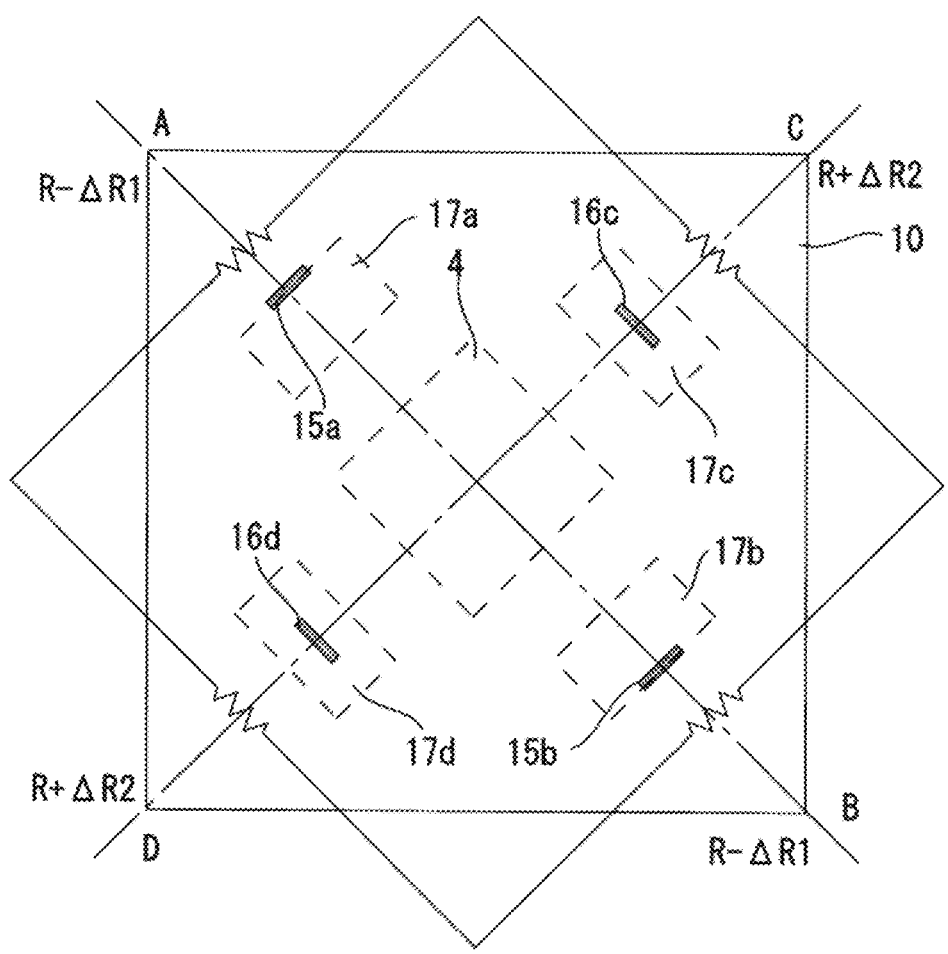
FIG. 4 is a conceptual diagram that shows a bridge circuit that comprises static pressure gauges and the resistance variations of the static pressure gauges.
Figure 5:
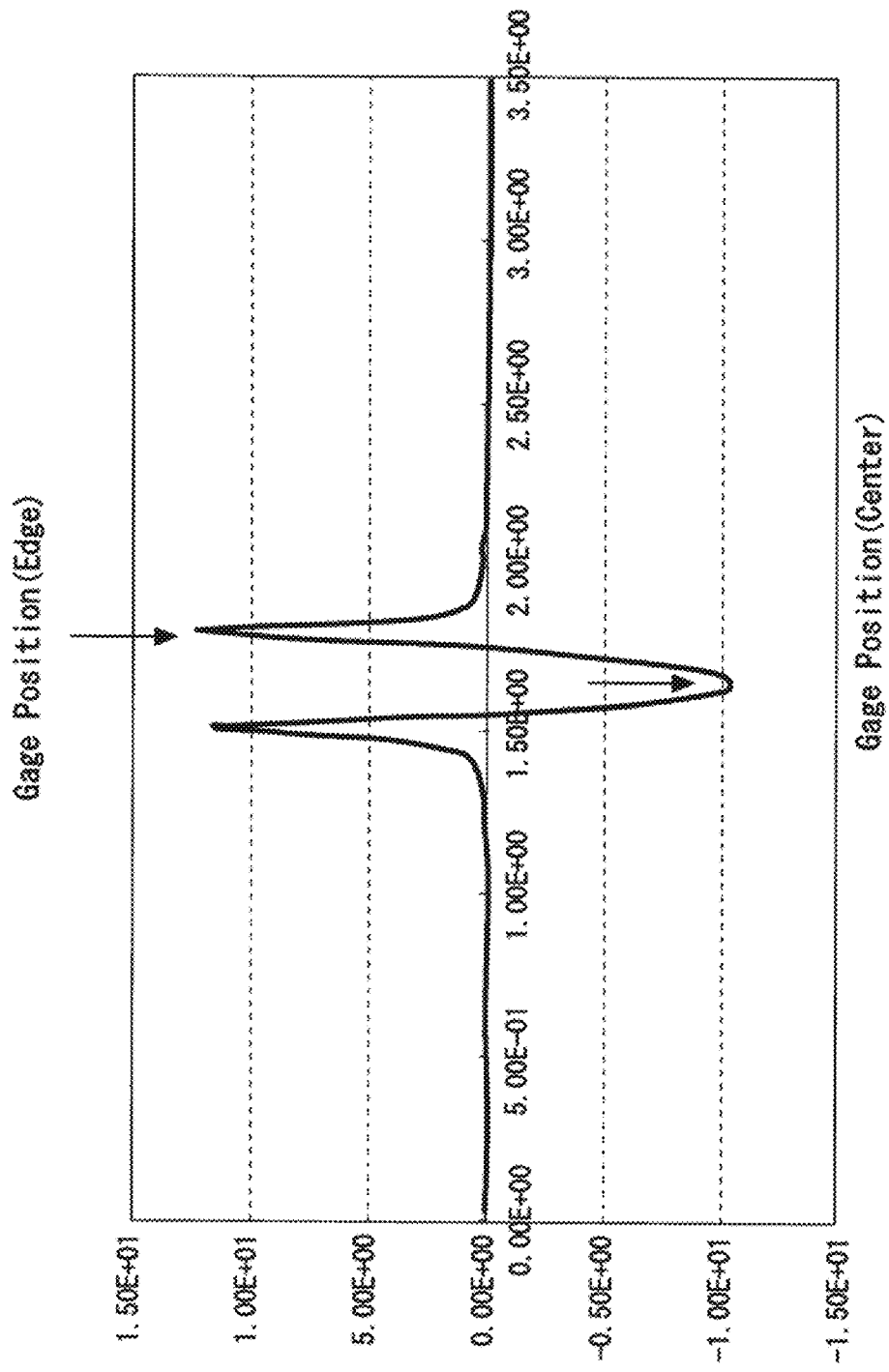
FIG. 5 is a stress distribution graph that shows the stress distribution starting from the center of a sensor chip when pressure is applied.

First, the following text explains why a decrease in measurement sensitivity can be prevented, referencing FIG. 4 and FIG. 5. FIG. 4 is a conceptual diagram that shows the bridge circuit, which comprises the static pressure gauges 15a, 15b, 16c, 16d, and the resistance variations thereof As shown in FIG. 4, the four static pressure gauges 15a, 15b, 16c, 16d are resistive devices, and constitute, for example, a Wheatstone bridge circuit. FIG. 5 is a view that shows the stress distribution starting from the center of the sensor chip 10 when a pressure of 3.5 MPa is applied. Furthermore, FIG. 5 shows the results of a simulation wherein stress is applied along the diagonal line CD. The results produced by the simulation were analyzed using the finite element method (FEM). In FIG. 5, the abscissa indicates the distance from the center of the sensor chip 10 and the ordinate indicates the stress. In FIG. 5, the left side arrow corresponds to the center positions of the static pressure diaphragms 17, and the right side arrow corresponds to the outer side edges of the static pressure diaphragms 17.

When pressure is applied, stresses are generated at the center parts and the end parts of the static pressure diaphragms 17 in opposite directions. For example, when a pressure of 3.5 MPa is applied, as shown in FIG. 5, the stresses at the center parts (i.e., the left side arrow) of the static pressure diaphragms 17 is negative, and the stresses at the end parts (i.e., the right side arrow) is positive. Namely, at the center parts of the static pressure diaphragms 17, the stresses form a negative peak; furthermore, at the end parts, the stresses form a positive peak.

Here, as shown in FIG. 4, the resistance value of each of the static pressure gauges 15a, 15b, 16c, 16d at a stipulated pressure is designated as R. The absolute value of the resistance variation of each of the static pressure gauges 15a, 15b caused by strain when pressure is applied is designated as $\Delta R1$, and the absolute value of the resistance variation of each of the static pressure gauges 16c, 16d is designated as $\Delta R2$. Thus, the resistance value of each of the static pressure gauges 15a, 15b, which are disposed at the end parts of the static pressure diaphragms 17, is given by $R-\Delta R1$. Moreover, the resistance value of each of the static pressure gauges 16c, 16d, which are disposed at the center parts of the static pressure diaphragms 17, is given by $R+\Delta R2$. Furthermore, both $\Delta R1$ and $\Delta R2$ are positive values. Namely, when pressure is applied, the resistance values of the two static pressure gauges 15a, 15b included in the first static pressure gauge pair 15 decrease and the resistance values of the two static pressure gauges 16c, 16d included in the second static pressure gauge pair 16 increase.

Thus, when the pressure changes from the stipulated pressure, the bridge circuit becomes unbalanced. The resistance variations of any two opposed static pressure gauges are in the same direction. Furthermore, the resistance variation values of the first static pressure gauge pair 15 and the resistance variation values of the second static pressure gauge pair 16 have opposite signs. Namely, the resistance variation of one of the pairs, that is, either the first static pressure gauge pair 15 or the second static pressure gauge pair 16, is positive while the resistance variation of the other pair is negative. Thereby, the larger the bridge output becomes, the greater the measurement sensitivity with respect to the static pressure.

Furthermore, the static pressure gauges 15a, 15b, 16c, 16d are formed along the long sides of the static pressure diaphragms 17. As shown in FIG. 5, the generated stresses peak at the edges and the centers of the static pressure diaphragms 17. Furthermore, at the edges and the centers, the static pressure gauges 15a, 15b, 16c, 16d are formed in the longitudinal directions of the static pressure diaphragms 17. The changes in the resistance values detected by the bridge circuit are values that are integrated in the longitudinal directions. Accordingly, the generated stresses can be efficiently transformed into changes in the resistance values. Thereby, it is possible to increase measurement sensitivity.

Figure 6:
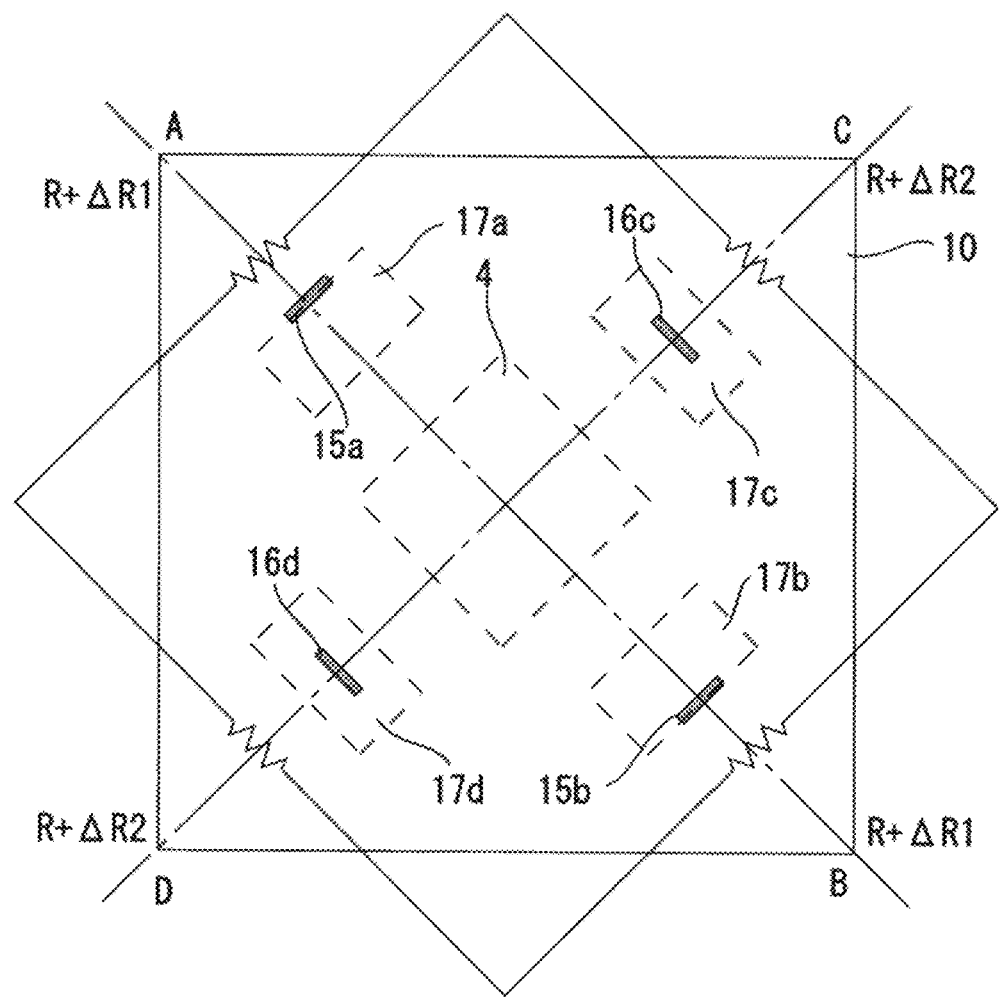
FIG. 6 is a conceptual diagram that shows a bridge circuit that comprises static pressure gauges and the resistance variations of the static pressure gauges.
Figure 7:
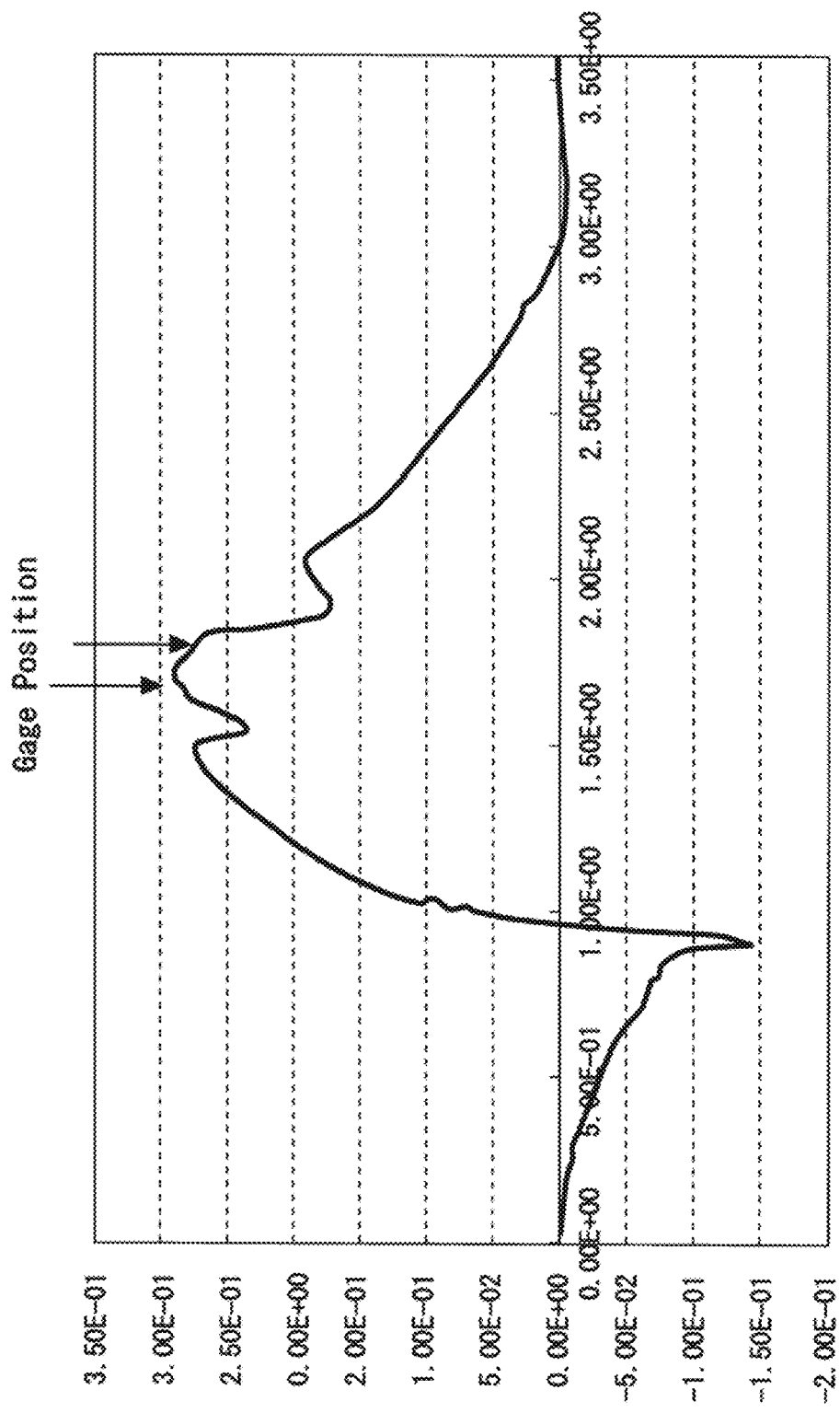
FIG. 7 is a stress distribution graph that shows the stress distribution starting from the center of a sensor chip when a temperature is set.

The following text explains, referencing FIG. 6 and FIG. 7, why it is possible to prevent measurement error owing to changes in the temperature of the measurement environment. Like FIG. 4, FIG. 6 is a conceptual diagram that shows the bridge circuit, which comprises the static pressure gauges 15a, 15b, 16c, 16d, and the resistance variations thereof FIG. 7 is a view that shows the stress distribution starting from the center of the sensor chip 10 when a temperature of −40° C. is set. Furthermore, FIG. 7 shows the results of a simulation wherein stress is applied along the diagonal line CD. The results produced by the simulation were analyzed using FEM. In FIG. 7, the abscissa indicates the distance from the center of the sensor chip 10 and the ordinate indicates the stress. In FIG. 7, the left side arrow corresponds to the center positions of the static pressure diaphragms 17, and the right side arrow corresponds to the outer side edges of the static pressure diaphragms 17.

The changes in the resistance values owing to stresses generated during a temperature change are in the same direction. Namely, as shown in FIG. 7, the stresses at the edges and the centers of the static pressure diaphragms 17 are generated in the same direction. For example, if compressive stresses are generated at the edges of the static pressure diaphragms 17 owing to a temperature change, then compressive stresses are also generated at the centers of the static pressure diaphragms 17. If tensile stresses are generated at the edges of the static pressure diaphragms 17 owing to a temperature change, then tensile stresses are also generated at the centers of the static pressure diaphragms 17. Accordingly, the resistance value of each of the static pressure gauges 15a, 15b is given by $R+\Delta R1$ and the resistance value of each of the static pressure gauges 16c, 16d is given by $R+\Delta R2$. Furthermore, $\Delta R1$ and $\Delta R2$ are positive numbers. Accordingly, the bridge output becomes small even if the temperature changes. Namely, output variation owing to temperature changes is prevented. Thereby, it is possible to prevent measurement error owing to temperature changes. Thereby, the temperature characteristics can be improved.

Figure 8A:
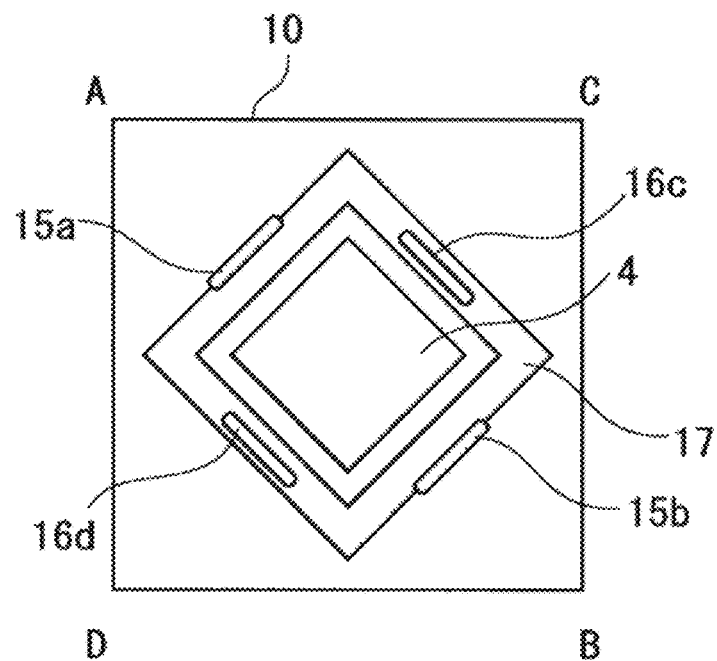
FIG. 8 contains top views, each of which shows another example of a configuration of the pressure sensor according to the embodiment of the present invention.

Disposing the first static pressure gauge pair 15, the second static pressure gauge pair 16, and the static pressure diaphragms 17 as described above makes it possible to implement a compact, high performance pressure sensor. In addition, the above text explained a case wherein each of the static pressure diaphragms 17 has an oblong shape, but the shape of each of the static pressure diaphragms 17 is not limited to an oblong. For example, the static pressure diaphragms 17 may have an elliptical shape or the like. Furthermore, the above text explained a case wherein the static pressure diaphragms 17 are provided only at locations corresponding to the first static pressure gauge pair 15 and the second static pressure gauge pair 16, but the static pressure diaphragms 17 may be formed in, for example, an annular or a polygonal shape such that they are continuous in the perimeter directions. For example, as shown in FIG. 8(a), the static pressure diaphragm 17 may be formed in a quadrilateral picture frame shape. Namely, a groove formed such that it surrounds the differential pressure diaphragm 4 may be used as the static pressure diaphragm 17. In other words, the static pressure diaphragm 17 may be of any shape as long as it has longitudinal directions and latitudinal directions. Furthermore, it should be disposed such that the latitudinal directions orthogonal to the longitudinal directions are in the radial directions. The longitudinal directions of each of the static pressure gauges 15a, 15b, 16c, 16d are disposed in the longitudinal directions of the static pressure diaphragm 17. Namely, the longitudinal directions of each of the static pressure gauges 15a, 15b, 16c, 16d are disposed in the perimeter directions. In the explanation above, the substrate and the differential pressure diaphragm 4 are square, but the present invention is not limited thereto; for example, they may be circular or the like.

In addition, in the explanation above, the static pressure gauges 15a, 15b, 16c, 16d are formed such that the straight line that connects the static pressure gauge 15a and the static pressure gauge 15b and the straight line that connects the static pressure gauge 16c and the static pressure gauge 16d are orthogonal, but the present invention is not limited thereto. Even in a configuration in which they are not orthogonal, the present invention can still be adapted to this case, albeit with characteristics inferior to those of the orthogonal configuration.

Figure 8B:
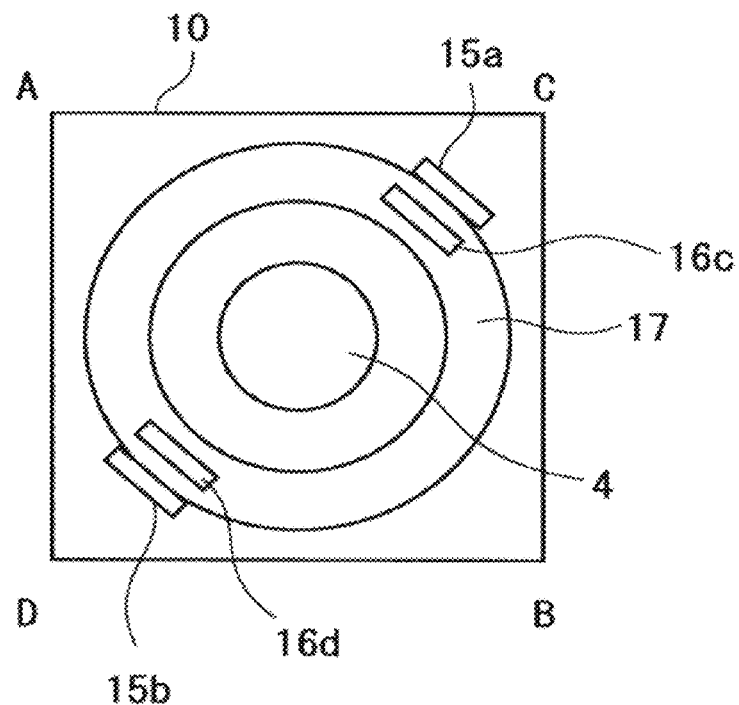

For example, as shown in FIG. 8(b), the straight line that connects the static pressure gauge 15a and the static pressure gauge 15b and the straight line that connects the static pressure gauge 16c and the static pressure gauge 16d may be made to coincide. In FIG. 8(b), the differential pressure diaphragm 4 is circular and the static pressure diaphragm 17 is annular. Furthermore, the static pressure diaphragm 17 surrounds the differential pressure diaphragm 4. The static pressure gauges 16c, 15a are disposed in the vicinity of the corner C, and the static pressure gauges 16d, 15b are disposed in the vicinity of the corner D. Accordingly, the static pressure gauges 16c, 16d are disposed between the static pressure gauge 15a and the static pressure gauge 15b. Here, the straight line that connects the two static pressure gauges 15a, 15b describes a straight line that connects the centers of the two static pressure gauges 16c, 16d. Furthermore, the differential pressure gauges 5a, 5b, 5c, 5d have the same layout as shown in FIG. 1 and therefore are not shown in FIG. 8.

Next, a method of fabricating the pressure sensor will be explained, referencing FIG. 9 and FIG. 10. FIG. 9 contains views, each of which shows the configuration of the sensor chip 10 viewed from above, that describe the method of fabricating the pressure sensor. FIG. 10 contains process cross sectional views, each of which shows a cross sectional view taken along the X-X line of FIG. 9, that depict the method of fabricating the pressure sensor.

First, the SOI wafer that comprises the first semiconductor layer 1, the insulation layer 2 with a thickness of approximately 0.5 μm, and the second semiconductor layer 3 is prepared. To manufacture the SOI wafer, the SIMOX (Separation by IMplanted OXygen) technology, wherein an Si substrate is implanted with oxygen to form an $SiO_2$ layer, may be used; alternatively, silicon direct bonding (SDB) technology, wherein two Si substrates are bonded together, may be used; in addition, other methods may also be used. Furthermore, the second semiconductor layer 3 may be planarized and made into a thin film. For example, a polishing method called computer controlled polishing (CCP) may be used to polish the second semiconductor layer 3 to a prescribed thickness.

Figure 9A:
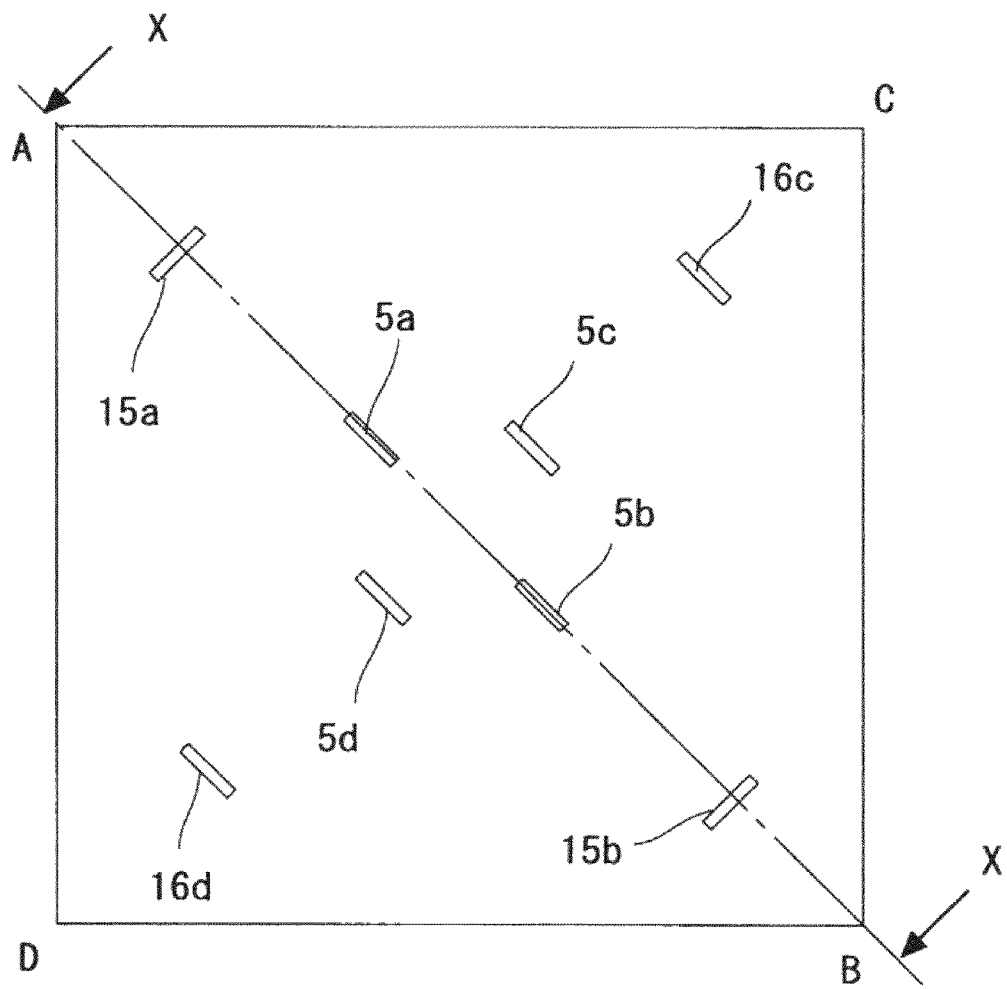
FIG. 9 contains views that show a process of fabricating the pressure sensor.
Figure 10A:
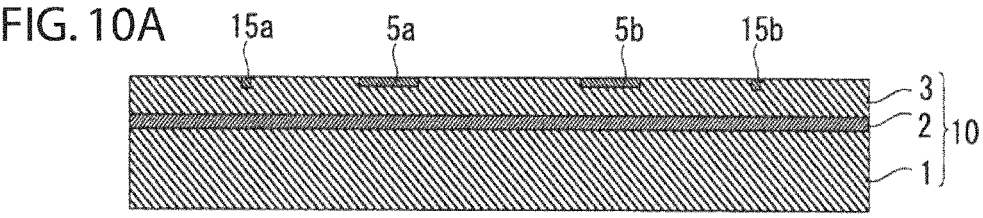
FIG. 10 contains process cross sectional views that show the process of fabricating the pressure sensor.

Impurity diffusion or an ion implanting method is used to form the differential pressure gauges 5a-5d and the static pressure gauges 15a, 15b, 16c, 16d, all of which are made of p-type Si, on the upper surface of the second semiconductor layer 3. Thereby, the configuration shown in FIG. 9(a) and FIG. 10(a) is created. As shown in FIG. 1 and the like, each of the gauges is formed at a prescribed position where one of the diaphragms is located. Furthermore, the differential pressure gauges 5a-5d, the static pressure gauges 15a, 15b, and the static pressure gauges 16c, 16d may be formed after the diaphragms are formed using the process described below. Of course, the differential pressure gauges 5 may be given different characteristics to those of the static pressure gauges 15a, 15b, 16c, 16d.

Figure 10B:
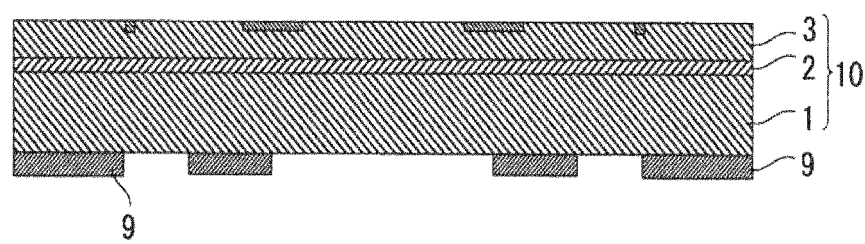

In the lower surface of the SOI wafer formed in this manner, a resist 9 is formed. The well known photolithographic process is used to form a pattern in the resist 9 on the first semiconductor layer 1. Namely, the pattern in the resist 9 is formed by applying a photosensitive resin layer, exposing it, and developing it. The resist 9 has openings at portions corresponding to pressure sensitive regions (i.e., regions wherein the diaphragms are formed). Namely, the first semiconductor layer 1 is exposed at the portions wherein the diaphragms are formed. Thereby, the configuration shown in FIG. 10(b) is created.

Figure 9B:
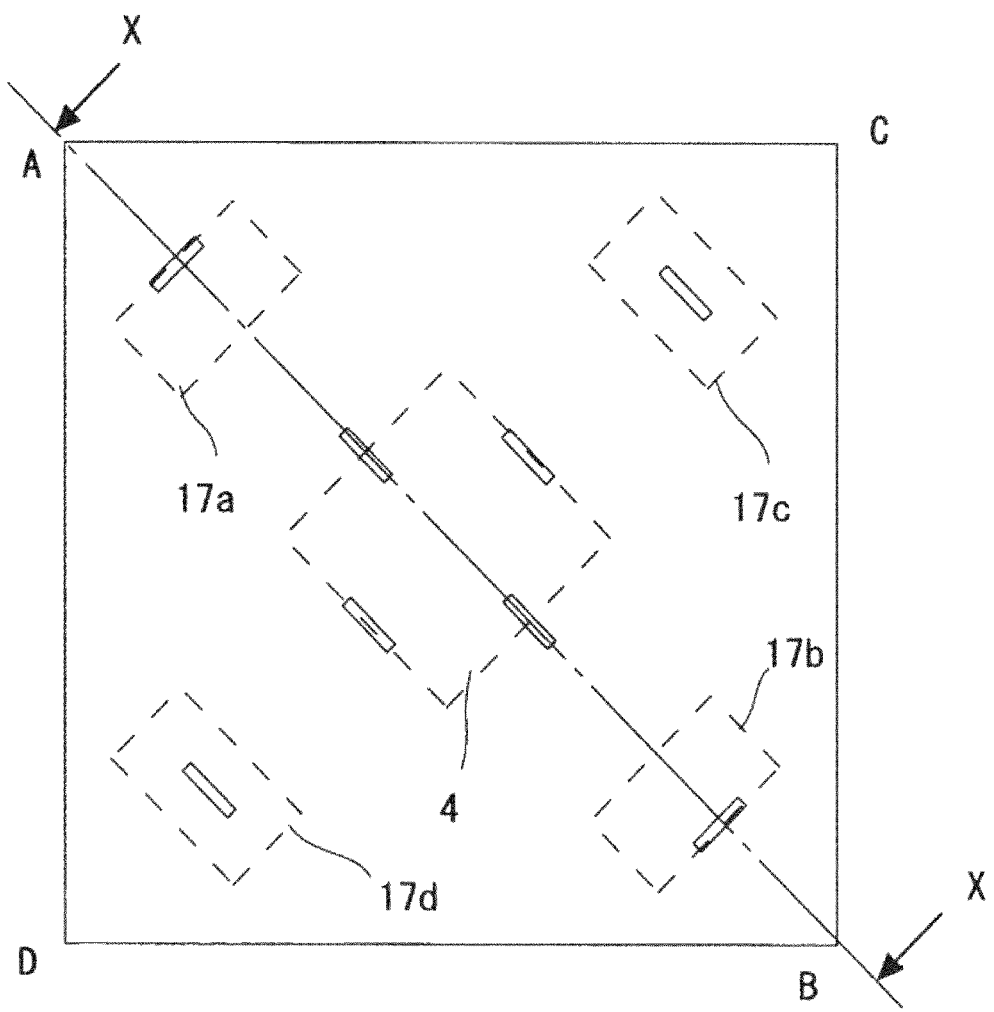
Figure 10C:
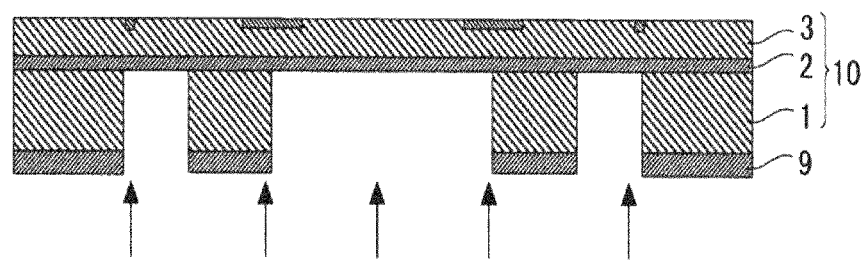

Furthermore, the first semiconductor layer 1 is etched using the resist 9 as a mask. Thereby, the configuration shown in FIG. 9(b) and FIG. 10(c) is created. For example, the first semiconductor layer 1 can be etched using dry etching such as ICP etching, which is well known. Of course, the first semiconductor layer 1 may be etched by wet etching, wherein a solution such as KOH or TMAH is used. Etching the first semiconductor layer 1 forms the differential pressure diaphragm 4 and the static pressure diaphragms 17. Here, the insulation layer 2 functions as an etching stop. Accordingly, the insulation layer 2 is exposed through the openings in the resist 9.

Figure 10D:
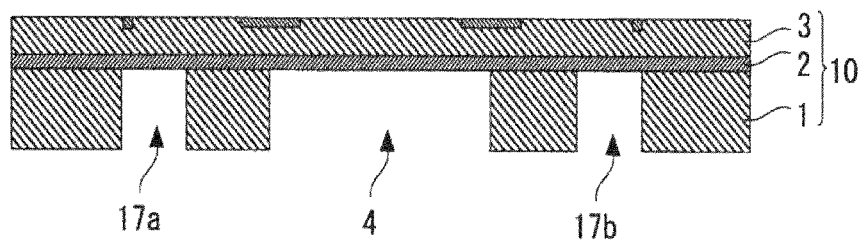

Furthermore, stripping the resist 9 creates the configuration shown in FIG. 10(d). Subsequently, wiring (not shown) for obtaining electrical connections among the first static pressure gauge pair 15, the second static pressure gauge pair 16, and the differential pressure gauges 5 is vapor deposited. Thereby, the sensor chip 10 is completed. Furthermore, the process that forms the wiring may be performed prior to the stage shown in FIG. 10(d). For example, the wiring may be formed prior to the stage shown in FIG. 10(a), or between the stages shown in FIG. 10(a) and FIG. 10(c). In addition, as described above, the first static pressure gauge pair 15, the second static pressure gauge pair 16, and the differential pressure gauges 5 may be formed after the stage shown in FIG. 10(d), or between the stages shown in FIG. 10(a) and FIG. 10(d). In other words, the process of forming the wiring and the order in which the strain gauges are formed are not particularly limited.

The sensor chip 10 is joined to a pedestal. The pedestal is formed from, for example, Pyrex® glass or a ceramic. For example, the pedestal is joined to the first semiconductor layer 1 of the sensor chip 10 by anodic bonding. A through hole that reaches the differential pressure diaphragm 4 is formed in the center of the pedestal. The through hole communicates with the differential pressure diaphragm 4. In addition, a protruding part is formed in the center part of the pedestal and recessed parts are formed in the outer perimeter parts thereof such that the locations at which the static pressure diaphragms 17 are formed become nonbonded parts. Accordingly, the boundaries between the protruding part and the recessed parts of the pedestal are disposed between the differential pressure diaphragm 4 and the static pressure diaphragms 17. Thus, the fabrication of the pressure sensor is completed. The pressure sensor fabricated in this way is compact and has high performance.

Furthermore, in the explanation above, the static pressure diaphragms 17 and the differential pressure diaphragm 4 are formed simultaneously, but they may be formed separately. Namely, the differential pressure diaphragm 4 and the static pressure diaphragms 17 may be formed through different etching processes. The fabricating process will now be explained, referencing FIG. 11 and FIG. 12.

FIG. 11 contains views, each of which shows the configuration of the sensor chip 10 viewed from above, that describe another method of fabricating the pressure sensor. FIG. 12 contains process cross sectional views, each of which is a cross sectional view taken along the XII-XII line of FIG. 11, that depict another method of fabricating the pressure sensor. Furthermore, the explanation of details the same as those explained referencing FIG. 9 and FIG. 10 is omitted.

Figure 11A:
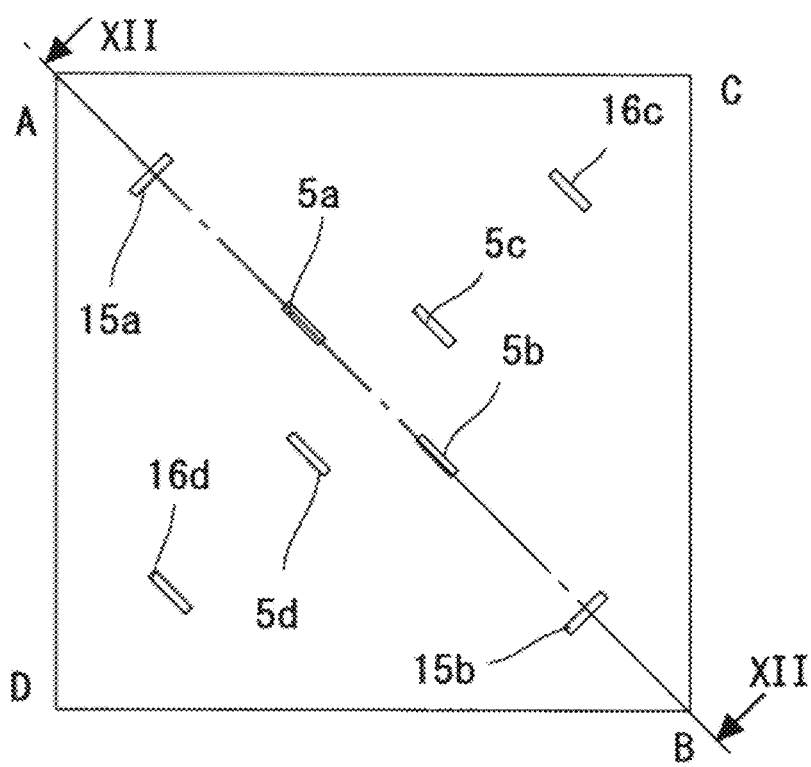
FIG. 11 contains views that show another process of fabricating the pressure sensor.
Figure 11B:
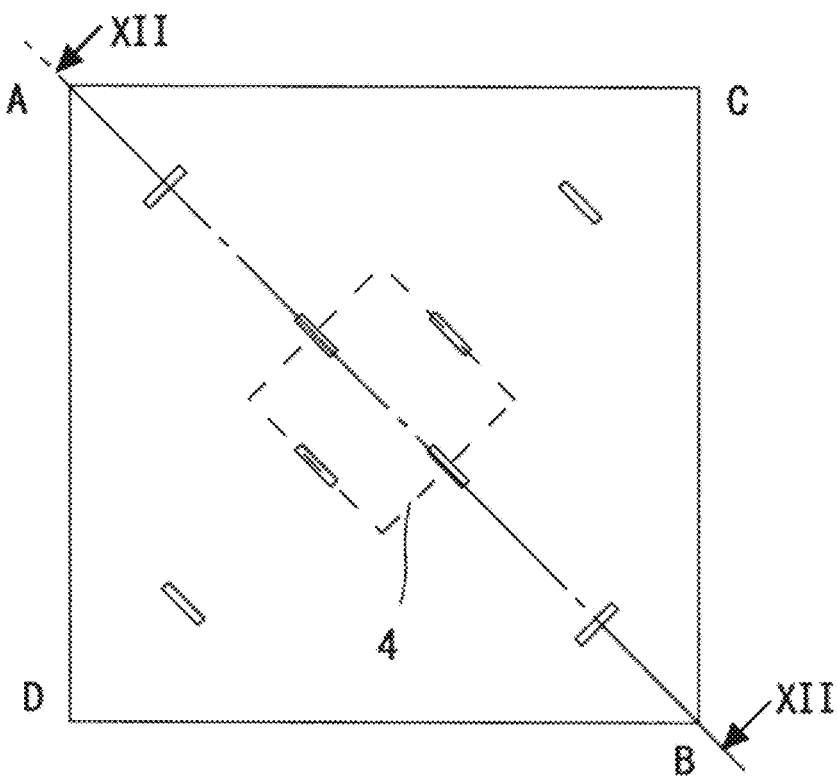
Figure 12A:
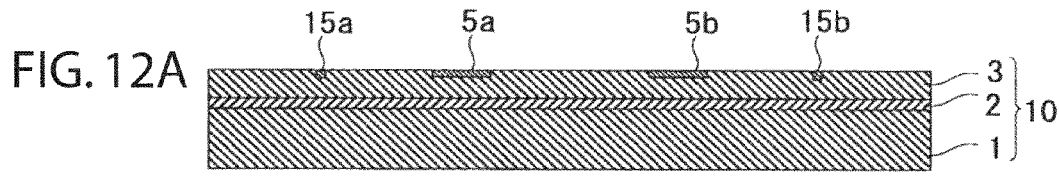
FIG. 12 contains process cross sectional views that show another process of fabricating the pressure sensor.
Figure 12B:
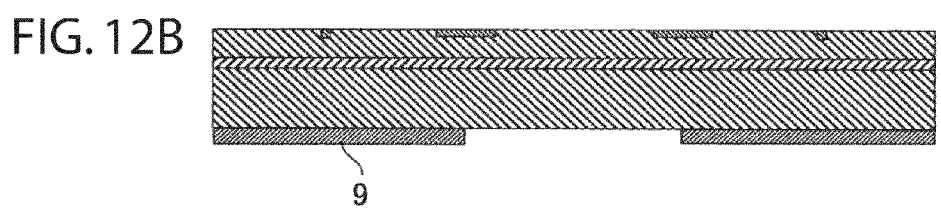

As shown in FIG. 11(a) and FIG. 12(a), a wafer that will become the sensor chip is prepared. This wafer is the same as the one shown in FIG. 9(a). Furthermore, the pattern in the resist 9 is formed on the first semiconductor layer 1. Thereby, the configuration shown in FIG. 12(b) is created. Here, the resist 9 has an opening such that the portion at which the differential pressure diaphragm 4 is to be formed is exposed. Namely, the locations at which the static pressure diaphragms 17 are to be formed are covered by the resist 9.

Figure 12C:
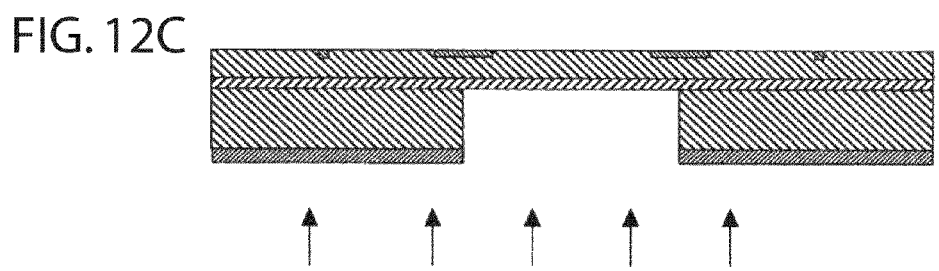
Figure 12D:
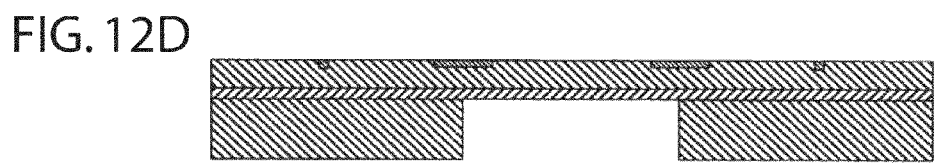

Furthermore, the first semiconductor layer 1 is etched using the resist 9 as a mask. Thereby, the configuration shown in FIG. 12(c) is created. Here, as mentioned above, the insulation layer 2 acts as the etching stop. Furthermore, stripping the resist 9 creates the configuration shown in FIG. 12(d) and FIG. 11(b). Here, the differential pressure diaphragm 4 is formed. Furthermore, at this stage, the locations that will become the static pressure diaphragms 17 are covered by the resist 9. Accordingly, the static pressure diaphragms 17 are not formed. Furthermore, stripping the resist 9 creates the configuration shown in FIG. 11(b) and FIG. 12(d).

Figure 12E:
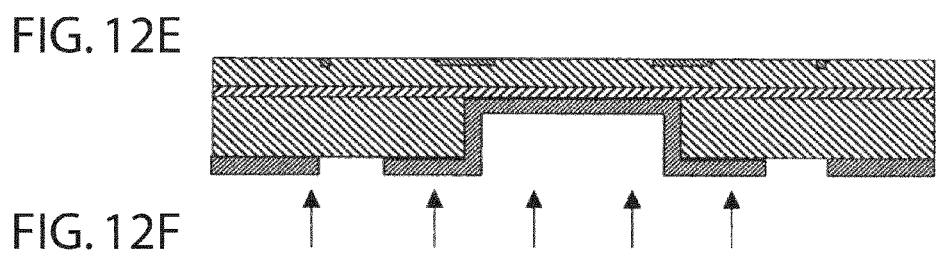
Figure 12F:
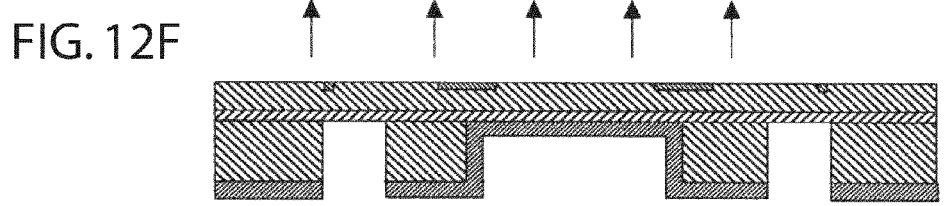

Next, the pattern in resist 9 is formed on the first semiconductor layer 1. Thereby, the configuration shown in FIG. 12(e) is created. The resist 9 has openings at the locations where the static pressure diaphragms 17 will be formed. Namely, the first semiconductor layer 1 is exposed in the regions where the static pressure diaphragms 17 will be formed. Moreover, the insulation layer 2 is covered with the resist 9 in the region wherein the differential pressure diaphragm 4 is formed. The first semiconductor layer 1 is etched, using the resist 9 as a mask. Thereby, the static pressure diaphragms 17 are formed and the configuration shown in FIG. 12(f) is created. Here, the insulation layer 2 is used as the etching stop.

Figure 12G:
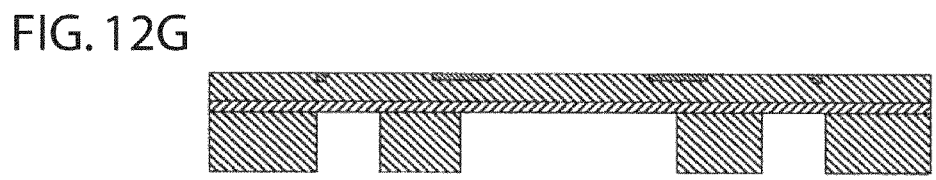

Furthermore, stripping the resist 9 creates the configuration shown in FIG. 11(c) and FIG. 12(g). Thereby, the sensor chip 10 is completed.

Thus, it is possible to form the static pressure diaphragms 17 and the differential pressure diaphragm 4 using separate etching processes. Thereby, it is possible to change the thicknesses of the static pressure diaphragms 17 and the thickness of the differential pressure diaphragm 4. Namely, the thicknesses of the static pressure diaphragms 17 and the thickness of the differential pressure diaphragm 4 can be controlled easily. For example, the individual thicknesses of the differential pressure diaphragm 4 and the static pressure diaphragms 17 can be optimized. Thereby, the pressure sensor wherein the thickness of each of the diaphragms is optimized can be fabricated easily. Namely, it is possible to fabricate the pressure sensor wherein the thicknesses of the differential pressure diaphragm 4 and the static pressure diaphragms 17 are different. In this case, the etching in at least one of the etching processes is completed before the exposure of the insulation layer 2.

Figure 13A:
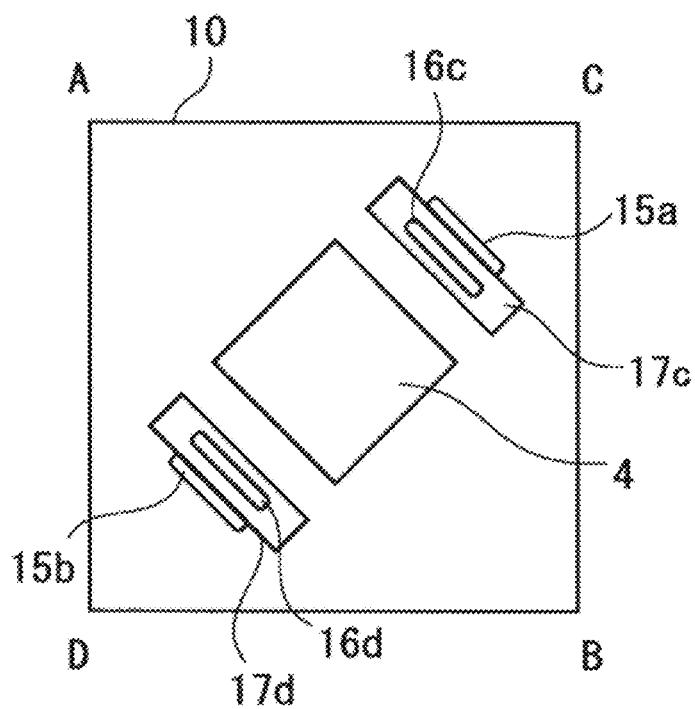
FIG. 13 contains top views that show the configuration of the pressure sensor according to another embodiment of the present invention.

The configuration of the pressure sensor according to another embodiment will now be explained, referencing FIG. 13. FIG. 13 contains top views of the sensor chip 10 used in the pressure sensor according to the present embodiment. In the present embodiment, as shown in FIG. 13(a), the static pressure gauges 15a, 15b, 16c, 16d are disposed at two locations. Namely, the static pressure gauges 15a, 16c and the static pressure gauges 15b, 16d are respectively disposed in the vicinities of the corner C and the corner D of the sensor chip 10. Furthermore, other aspects of the configuration are the same as those in the first embodiment, and the explanations thereof are therefore omitted.

As shown in FIG. 13(a), the static pressure gauges 15a, 16c are formed in the single static pressure diaphragm 17c. In addition, the two static pressure gauges 15b, 16d are disposed in the static pressure diaphragm 17d. Furthermore, the static pressure gauge 15a is disposed in an end part of the static pressure diaphragm 17c, and the static pressure gauge 16c is disposed in the center part of the static pressure diaphragm 17c. The static pressure gauge 15b is disposed in an end part of the static pressure diaphragm 17d, and the static pressure gauge 16d is disposed in the center part of the static pressure diaphragm 17d. Furthermore, in the configuration shown in FIG. 13(a), the static pressure diaphragms 17a, 17b are unnecessary. In this configuration, too, the same effects as those obtained in the first embodiment can be obtained.

Figure 13B:
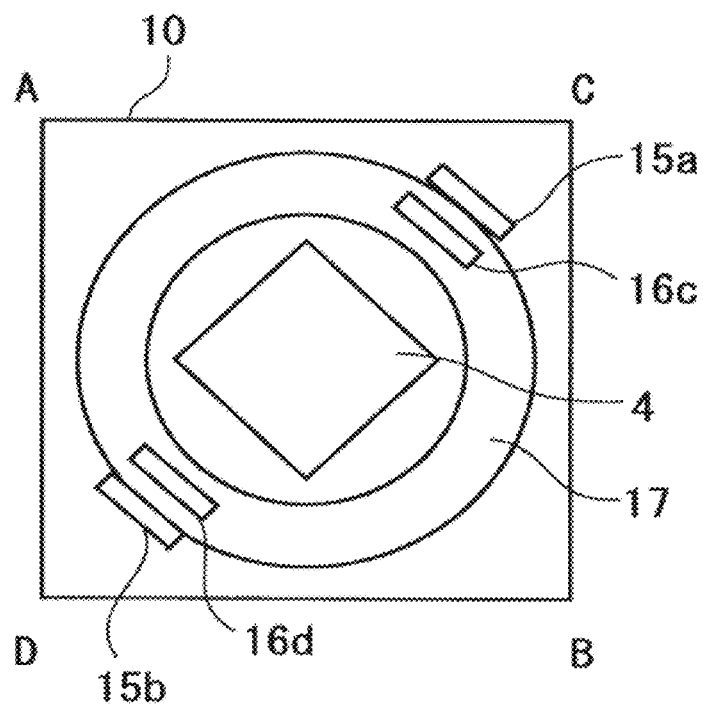

In addition, as shown in FIG. 13(b), the static pressure diaphragms 17 can also be annular. Furthermore, in FIG. 13(b), the differential pressure diaphragm 4 in FIG. 8(b) is configured as a square. Other aspects of the configuration are the same as those in the first embodiment, and the explanations thereof are therefore omitted.

In the present embodiment, too, the static pressure gauges 15a, 15b are disposed in the radial directions at the end parts of the static pressure diaphragms 17, and the static pressure gauges 16c, 16d are disposed in the center parts of the static pressure diaphragms 17. Accordingly, the distance from the static pressure gauge 15a to the center of the sensor chip 10 and the distance from the static pressure gauge 15b to the center of the sensor chip 10 are equal. The distance from the static pressure gauge 16d to the center of the sensor chip 10 and the distance from the static pressure gauge 16c to the center of the sensor chip 10 are equal. Furthermore, the distance from the static pressure diaphragm 15a to the center of the sensor chip 10 and the distance from the static pressure diaphragm 16c to the center of the sensor chip 10 are not equal. In this configuration, too, the same effects as those obtained in the other embodiment can be obtained. Furthermore, in this embodiment, the straight line that connects the static pressure gauge 15a and the static pressure gauge 15b and the straight line that connects the static pressure gauge 16c and the static pressure gauge 16d coincide.

Figure 14:
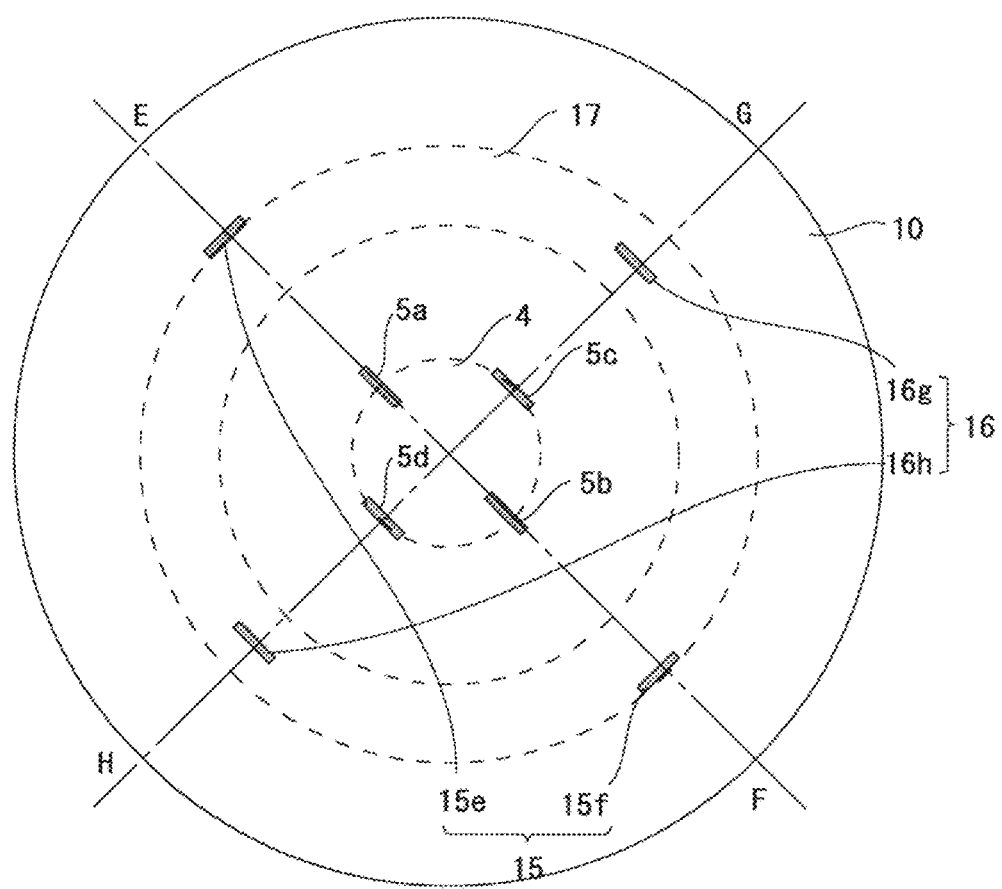
FIG. 14 is a top view that shows the configuration of the pressure sensor according to a further embodiment of the present invention.

The configuration of the pressure sensor according to the present embodiment will now be explained, referencing FIG. 14. FIG. 14 is a top view of the sensor chip 10 that is used in the pressure sensor. Furthermore, in the pressure sensor according to the present embodiment, the shape of the sensor chip 10 of the pressure sensor and the shapes of the diaphragms 4, 17 are different from those described above. Specifically, the sensor chip 10 and the differential pressure diaphragm 4 are circular, and the static pressure diaphragm 17 is annular. Furthermore, other aspects of the basic configuration are the same as those in the sensor chip 10 described in the above embodiment, and explanations thereof are therefore omitted. Namely, particularly those locations for which there is no explanation are the same as those in the above embodiments. In addition, the fabricating process is the same as that of the above embodiments, and the explanation thereof is therefore omitted.

In the present embodiment, the sensor chip 10 is circular. Straight lines that pass through the center of the circular sensor chip 10 are designated as line EF and line GH. The line EF and the line GH are orthogonal. The line EF and the line GH correspond to the diagonal line AB and the diagonal line CD described in the above embodiments. Furthermore, the differential pressure diaphragm 4 is formed in the center part of the sensor chip 10.

The differential pressure diaphragm 4 is circular. The differential pressure diaphragm 4 is concentric with the sensor chip 10. Accordingly, the center of the differential pressure diaphragm 4 coincides with the intersection point between the line EF and the line GH. As in the above embodiments, the differential pressure gauges 5 are formed at the circumferential edge of the differential pressure diaphragm 4.

Furthermore, the static pressure diaphragm 17 is provided to an outer circumferential part of the differential pressure diaphragm 4. In the present embodiment, one annular static pressure diaphragm 17 is provided. Namely, instead of the four static pressure diaphragms 17 described in the above embodiments, just one ring shaped static pressure diaphragm 17 is provided. The static pressure diaphragm 17 is formed in the sensor chip 10 by providing an annular groove. The static pressure diaphragm 17 is disposed such that it surrounds the differential pressure diaphragm 4. The annular static pressure diaphragm 17 has a circular shape that is concentric with the sensor chip 10 and the differential pressure diaphragm 4. Namely, the outer edge and the inner edge of the static pressure diaphragm 17 are circular, and the centers of those circles coincide with the intersection point between the line EF and the line GH.

Furthermore, the first static pressure gauge pair 15 and the second static pressure gauge pair 16 are provided to the static pressure diaphragm 17. The first static pressure gauge pair 15 is disposed on the line EF, and the static pressure gauge pair 16 is disposed on the line GH. The two static pressure gauges included in the first static pressure gauge pair 15 are designated as static pressure gauges 15e, 15f, and the two static pressure gauges included in the second static pressure gauge pair 16 are designated as static pressure gauges 16g, 16h. The static pressure gauge 15e and the static pressure gauge 15f are disposed such that they oppose one another and sandwich the differential pressure diaphragm 4. The static pressure gauge 16g and the static pressure gauge 16h are disposed such that they oppose one another and sandwich the differential pressure diaphragm 4.

The static pressure gauges 15e, 15f are formed at the end part of the static pressure diaphragm 17. Here, the static pressure gauges 15e, 15f are formed along the outer edge of the static pressure diaphragm 17. The static pressure gauges 16g, 16h are formed at the center part of the static pressure diaphragm 17. Furthermore, the static pressure gauges 15e, 15f, 16g, 16h are formed in directions perpendicular to the width directions of the annular shape. Namely, the longitudinal directions of each of the static pressure gauges 15e, 15f, 16g, 16h coincide with the circumferential directions. Accordingly, the spacing between the static pressure gauges 15e, 15f is different from that between the static pressure gauges 16g, 16h.

The static pressure gauges 15e, 15f, which are disposed such that they oppose one another, are formed on the edge of the static pressure diaphragm 17, and the static pressure gauges 16g, 16h, which are disposed such that they oppose one another, are formed at the center of the static pressure diaphragm 17. Furthermore, the long sides of the static pressure gauges 15e, 15f, 16g, 16h are perpendicular to the radial directions of the static pressure diaphragm 17.

Adopting such a configuration makes it possible to obtain the same effects as those obtained in the first embodiment. Namely, as explained in the above embodiments, when pressure is applied, the resistance variations of any two static pressure gauges that are disposed such that they oppose one another are in the same direction. Furthermore, the signs of the resistance variation values at the first static pressure gauge pair 15 and the second static pressure gauge pair 16 are opposite. Namely, the resistance variation of one of the pairs, that is, the first static pressure gauge pair 15 or the second static pressure gauge pair 16, is positive while the resistance variation of the other pair is negative. Thereby, the larger the bridge output becomes, the greater the measurement sensitivity with respect to the static pressure becomes.

Furthermore, in the present embodiment, the first static pressure gauge pair 15 is disposed on the line EF and the second static pressure gauge pair 16 is disposed on the line GH, but they do not necessarily have to be disposed evenly in the circumferential directions; for example, the same effects can be obtained as long as the first static pressure gauge pair 15 and the second static pressure gauge pair 16 are each formed on the edge or the center of the annular static pressure diaphragm 17.

In addition, the changes in the resistance values owing to stress generated during a temperature change are in the same direction. Namely, the stresses generated at the edge and the center of the static pressure diaphragm 17 are in the same direction. The resistance values change to the positive direction. Accordingly, even if the temperature changes, the bridge output becomes small. Thereby, measurement error owing to a change in temperature can be prevented. Thereby, the temperature characteristics can be improved.

Disposing the first static pressure gauge pair 15, the second static pressure gauge pair 16, and the static pressure diaphragm 17 as described above makes it possible to implement a compact, high performance pressure sensor.

Furthermore, in FIG. 14, the outer edges of the differential pressure diaphragm 4 and the static pressure diaphragm 17 and the inner edge of the static pressure diaphragm 17 are circular, but they may be polygonal. In such a case, a regular polygon that is close to being circular would be preferable. It also would be preferable for the number of corners of the regular polygon to be even and furthermore for that number to be computed by $2^n$. Furthermore, n is a natural number of 3 or greater. Specifically, a regular polygon with at least as many corners as a regular octagon would be preferable. Furthermore, a regular polygon with at least as many corners as a regular hexadecagon would be more preferable. The number of corners may be increased to, for example, those of a regular hexadecagon, a regular triacontadigon, or a regular hexacontatetragon. The distance from the center of the sensor chip 10 to each corner of all corners of the polygon is the same. Of course, one of the diaphragms, that is, the differential pressure diaphragm 4 or the static pressure diaphragm 17, may be polygonal while the other diaphragm is circular.

Figure 15:
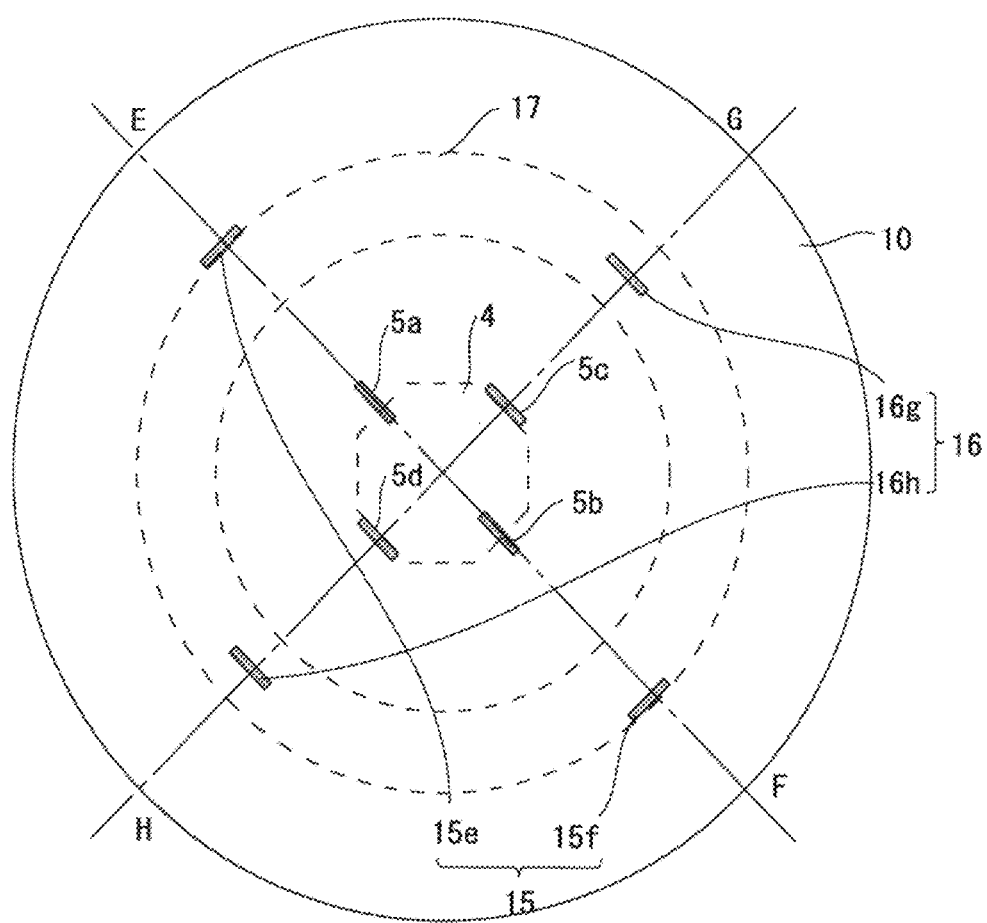
FIG. 15 is a top view that shows another configuration of the pressure sensor according to the further embodiment of the present invention.

For example, as shown in FIG. 15, the differential pressure diaphragm 4 may be a regular octagon while the static pressure diaphragm 17 remains circular. Namely, the inner edge and the outer edge of the static pressure diaphragm 17 is circular. Conversely, the differential pressure diaphragm 4 may remain circular while the static pressure diaphragm 17 is a regular polygon.

Figure 16:
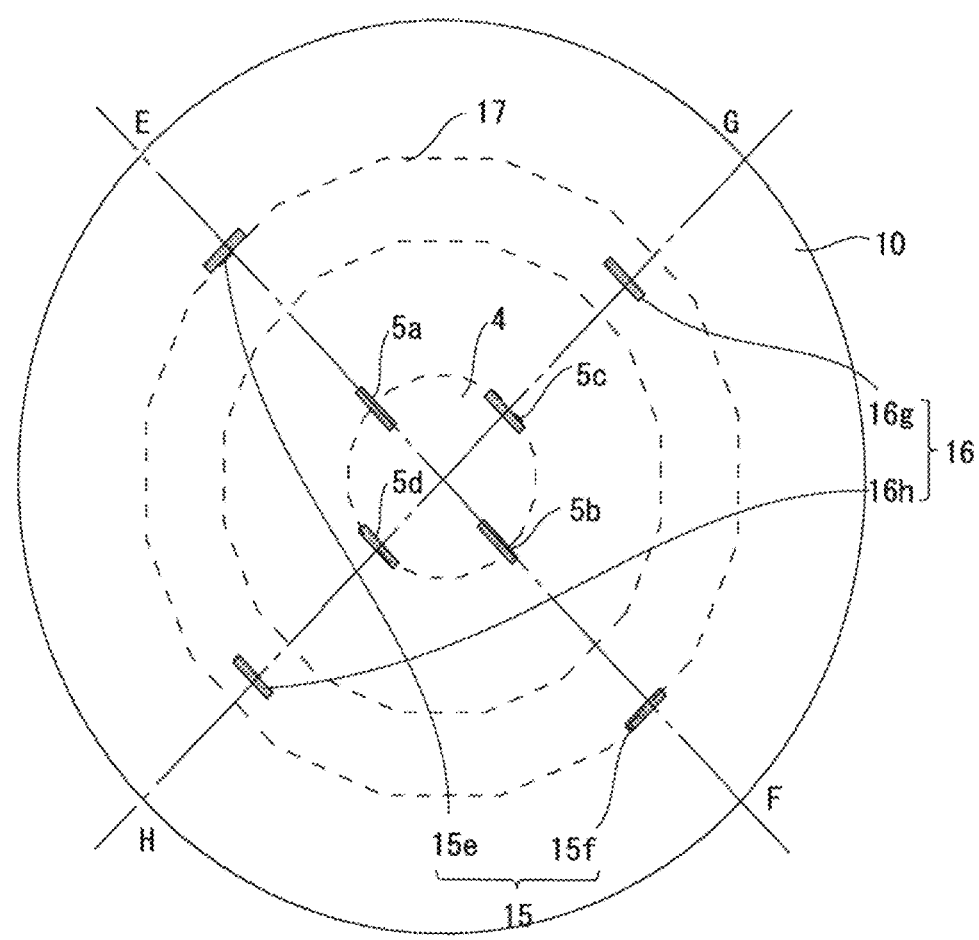
FIG. 16 is a top view that shows another configuration of the pressure sensor according to the further embodiment of the present invention.

Furthermore, as shown in FIG. 16, both the differential pressure diaphragm 4 and the static pressure diaphragm 17 may be regular polygons. In FIG. 16, both the differential pressure diaphragm 4 and the static pressure diaphragm 17 are regular hexadecagons. Accordingly, the inner edge and the outer edge of the static pressure diaphragm 17 are regular hexadecagons. In this case, the static pressure diaphragm 17 is tilted by 45° with respect to the differential pressure diaphragm 4. Thus, even though the diaphragm is polygonal, substantially the same effects can be obtained. In addition, like the differential pressure diaphragm 4 and the static pressure diaphragm 17, the sensor chip 10 may be a regular polygon. Furthermore, the abovementioned embodiments may be appropriately combined.

What is claimed is:

1. A pressure sensor, comprising:
   a substrate;
   a differential pressure diaphragm, which is provided to a center part of the substrate;

a differential pressure gauge, which is provided to the differential pressure diaphragm;

a static pressure diaphragm, which is provided to an outer perimeter part of the differential pressure diaphragm;

a first static pressure gauge pair that is formed in an end part of the static pressure diaphragm and comprises two static pressure gauges, which are disposed such that they sandwich the differential pressure diaphragm; and a second static pressure gauge pair that is formed in the center part of the static pressure diaphragm and comprises two static pressure gauges, which are disposed such that they sandwich the differential pressure diaphragm.

2. A pressure sensor according to claim 1, wherein a straight line that connects the static gauges of the first static pressure gauge pair and a straight line that connects the static gauges of the second static pressure gauge pair are orthogonal.

3. A pressure sensor according to claim 1, wherein the straight line that connects the static gauges of the first static pressure gauge pair and the straight line that connects the static gauges of the second static pressure gauge pair coincide.

4. A pressure sensor according to claim 1, wherein the two static pressure gauges included in the first static pressure gauge pair are formed in either the end parts of the static pressure diaphragm on the substrate center side or the end parts of the static pressure diaphragm on the substrate end sides.

5. A pressure sensor, according to claim 1, wherein four static pressure diaphragms are provided corresponding to the four static pressure gauges included in the first and second static pressure gauge pairs; and the latitudinal directions of the four static pressure diaphragms are disposed in the radial directions with respect to the center of the differential pressure diaphragm.

6. A pressure sensor according to claim 5, wherein the four static pressure gauges included in the first and second static pressure gauge pairs are formed in directions perpendicular to the latitudinal directions of the static pressure diaphragm.

7. A pressure sensor according to claim 5, wherein the static pressure diaphragm is oblong.

8. A pressure sensor according to claim 1, wherein two of the static pressure diaphragms are provided corresponding to the four static pressure gauges included in the first and second static pressure gauge pairs; and the latitudinal directions of the two static pressure detection diaphragms are disposed in the radial directions with respect to the center of the differential pressure diaphragm.

9. A pressure sensor according to claim 1, wherein the static pressure diaphragm is formed in an annular shape such that it surrounds the differential pressure diaphragm; and the four static pressure gauges included in the first and second static pressure gauge pairs are formed in the circumferential directions of the annular static pressure diaphragm.

10. A pressure sensor according to claim 9, wherein the differential pressure diaphragm is circular.

11. A pressure sensor according to claim 9, wherein the annular static pressure diaphragm and the circular differential pressure diaphragm are disposed concentrically.

12. A pressure sensor according to claim 9, wherein the substrate is circular.

* * * * *